Jan. 25, 1966 R. R. HANSON 3,230,730
COMPRESSORS AND UNITARY CONTROL MEANS THEREFOR
Filed March 12, 1962 15 Sheets-Sheet 1

INVENTOR.
ROY R. HANSON
BY Alfred W. Petchaft
ATTORNEY

INVENTOR.
ROY R. HANSON
BY Alfred W. Petchaft
ATTORNEY

Jan. 25, 1966   R. R. HANSON   3,230,730
COMPRESSORS AND UNITARY CONTROL MEANS THEREFOR
Filed March 12, 1962   15 Sheets-Sheet 3
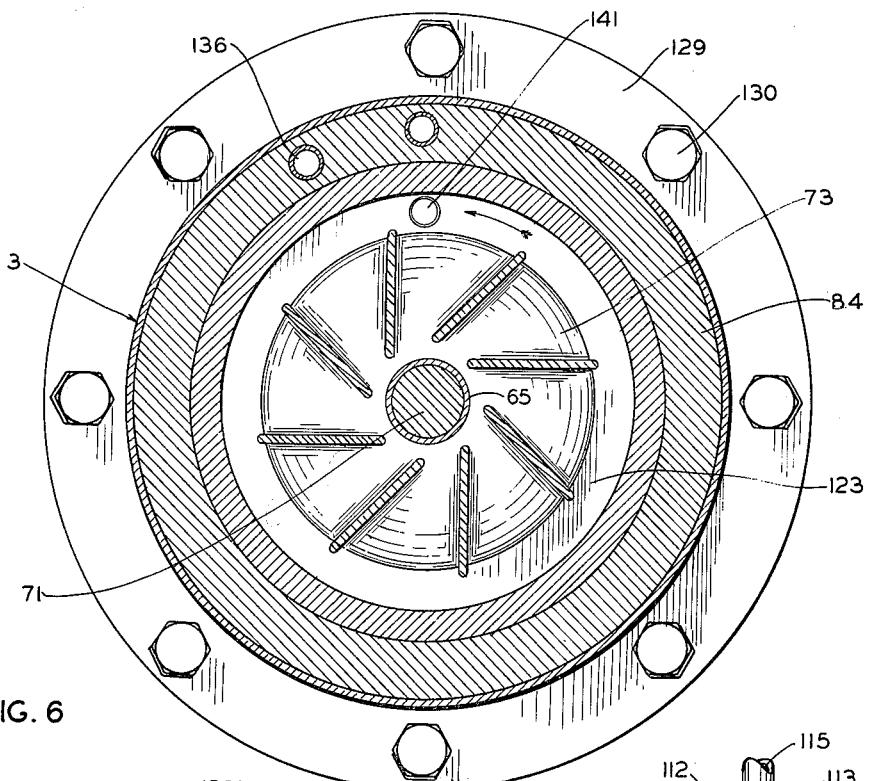
FIG. 6
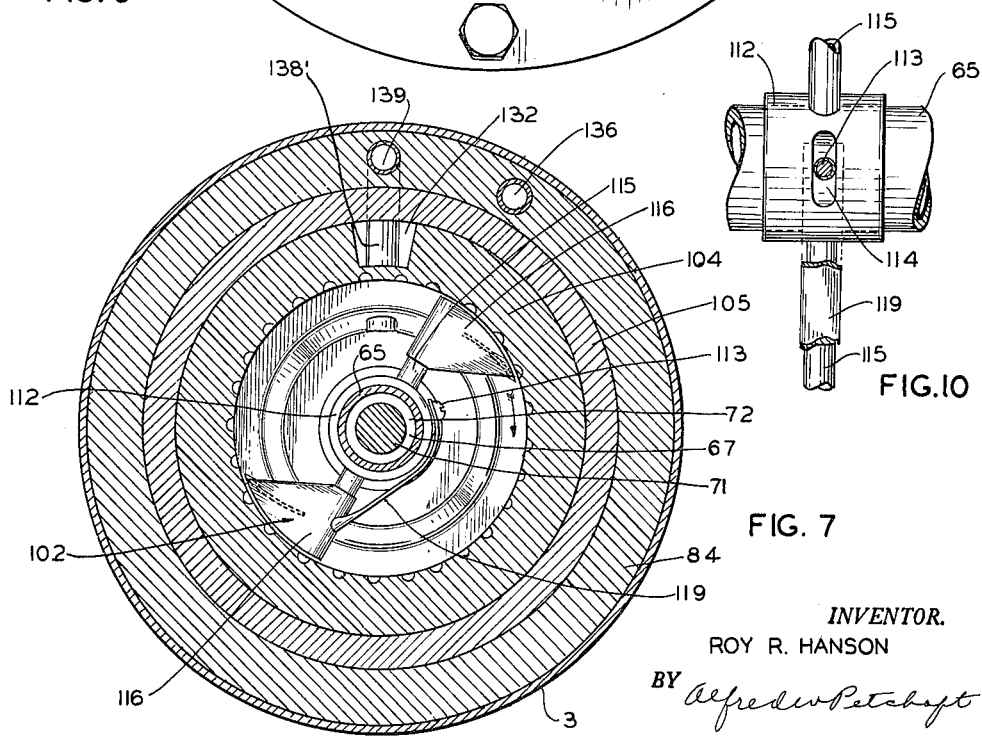
FIG. 7
FIG. 10
INVENTOR.
ROY R. HANSON
BY *Alfred W Petschaft*
ATTORNEY INVENTOR.
ROY R. HANSON
BY Alfred W. Petschaft
ATTORNEY Jan. 25, 1966  R. R. HANSON  3,230,730
COMPRESSORS AND UNITARY CONTROL MEANS THEREFOR
Filed March 12, 1962  15 Sheets-Sheet 6

*INVENTOR.*
ROY R. HANSON
BY Alfred W. Petchoft
ATTORNEY

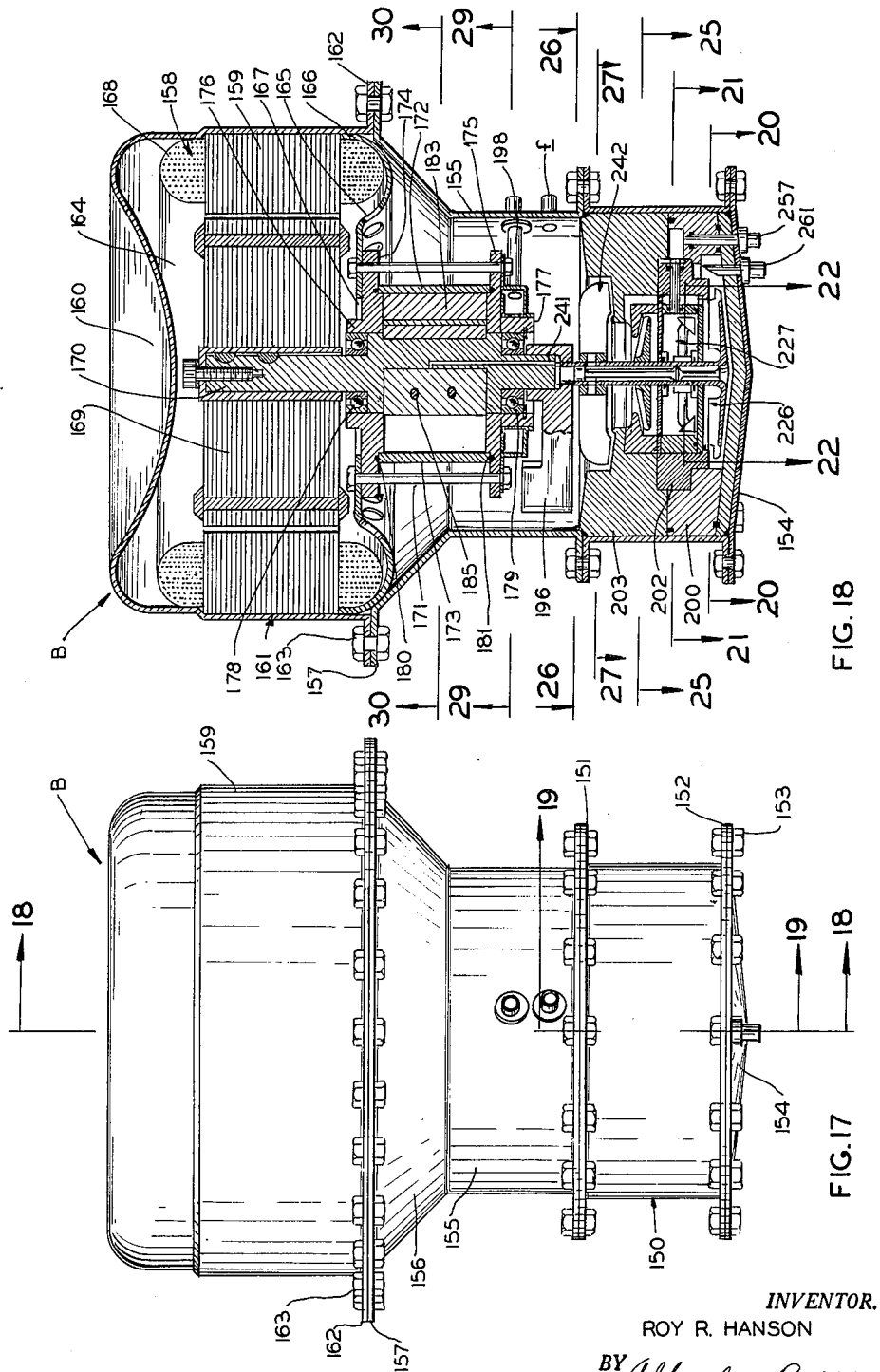

Jan. 25, 1966  R. R. HANSON  3,230,730
COMPRESSORS AND UNITARY CONTROL MEANS THEREFOR
Filed March 12, 1962  15 Sheets-Sheet 8

INVENTOR.
ROY R. HANSON
BY *Alfred W. Petchaft*
ATTORNEY

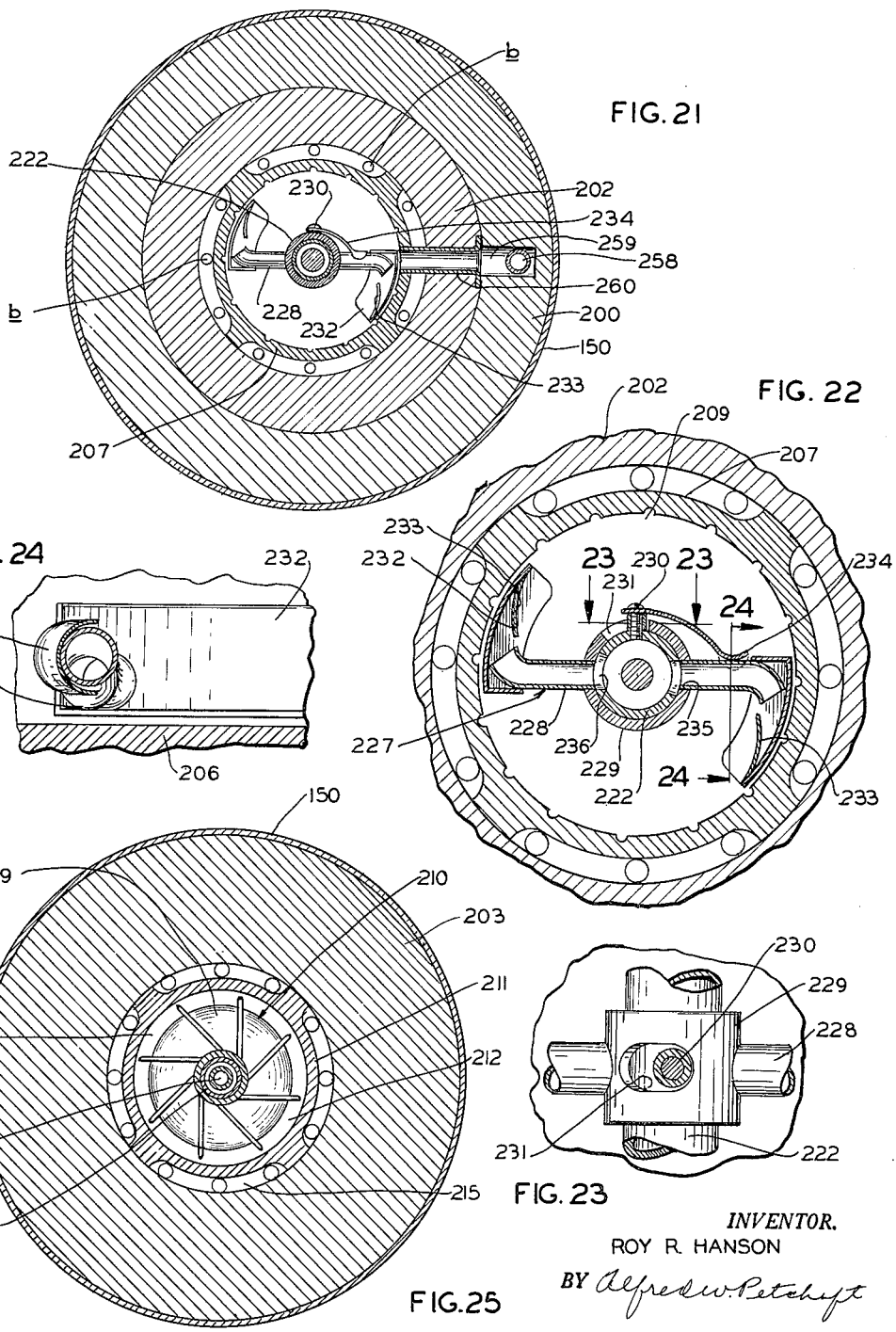

Jan. 25, 1966    R. R. HANSON    3,230,730
COMPRESSORS AND UNITARY CONTROL MEANS THEREFOR
Filed March 12, 1962    15 Sheets-Sheet 10
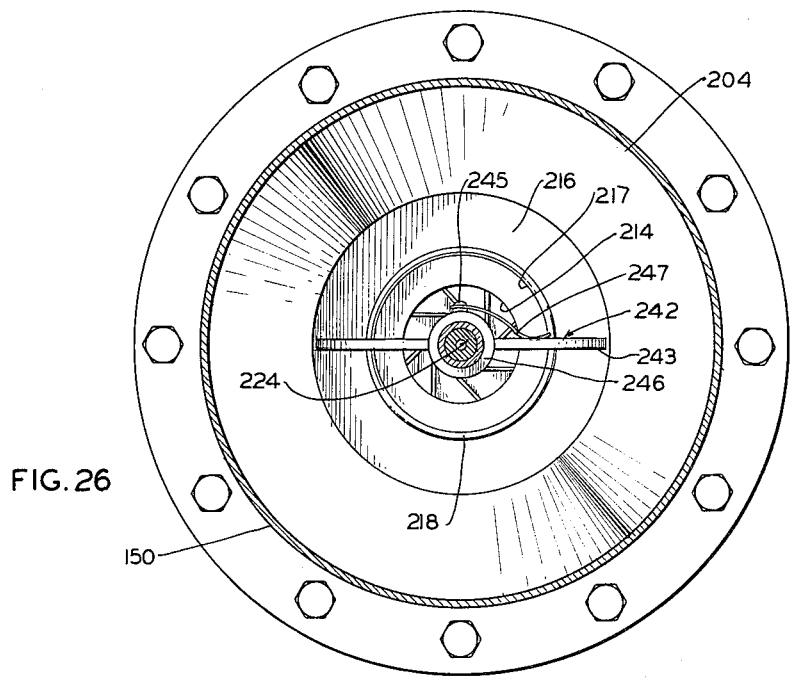
FIG. 26
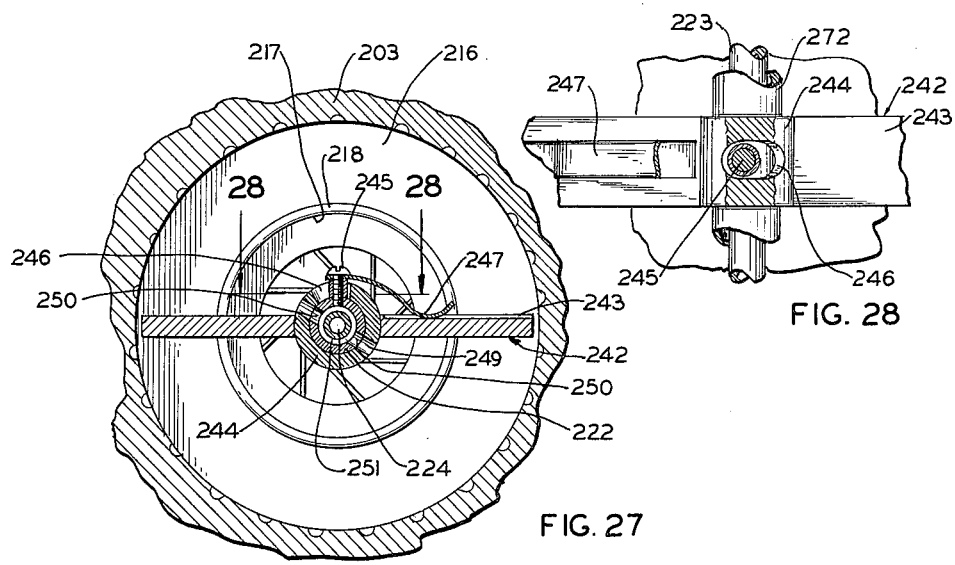
FIG. 27
FIG. 28
INVENTOR.
ROY R. HANSON
BY Alfred W. Petchaft
ATTORNEY Jan. 25, 1966 R. R. HANSON 3,230,730
COMPRESSORS AND UNITARY CONTROL MEANS THEREFOR
Filed March 12, 1962 15 Sheets-Sheet 11

INVENTOR.
ROY R. HANSON
BY Alfred W. Petchaft
ATTORNEY

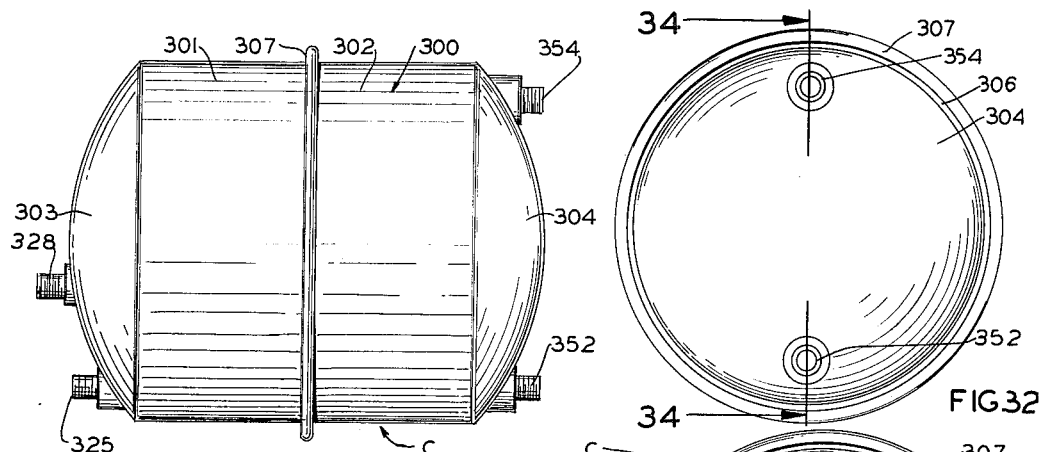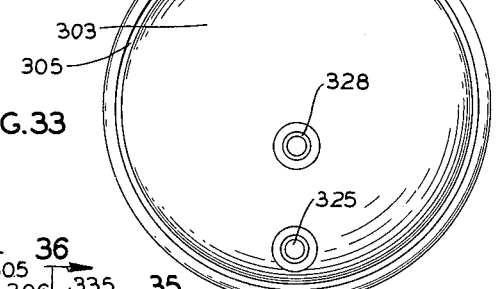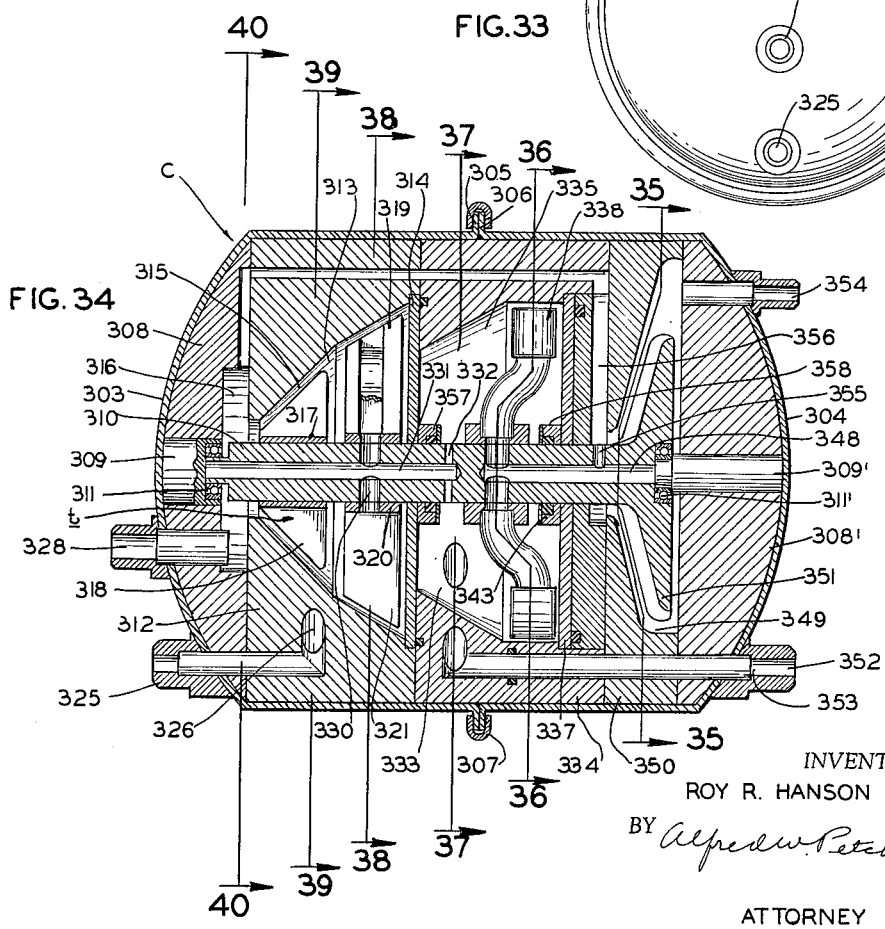

Jan. 25, 1966  R. R. HANSON  3,230,730
COMPRESSORS AND UNITARY CONTROL MEANS THEREFOR
Filed March 12, 1962  15 Sheets-Sheet 14

INVENTOR.
ROY R. HANSON
BY *Alfred W. Petchaft*
ATTORNEY

United States Patent Office 3,230,730
Patented Jan. 25, 1966

3,230,730
COMPRESSORS AND UNITARY CONTROL
MEANS THEREFOR
Roy R. Hanson, Maryland Heights, Mo., assignor of one-fourth to William H. Anderson, Glencoe, and one-fourth to Joseph H. Schierman and one-fourth to George A. Blase, St. Louis, Mo.
Filed Mar. 12, 1962, Ser. No. 178,930
25 Claims. (Cl. 62—197)

This invention relates in general to refrigerating equipment and, more particularly, to a compressor and unitary control system for use with compressors.

Standard refrigerating and air-conditioning units involve the use of a compressor which compresses a refrigerant to high pressure and thereupon delivers the high-pressure refrigerant to a condenser. The condenser cools the high-pressure gas to a point below its critical temperature to a liquid state, and the liquid is thereupon delivered to an evaporator. In the evaporator, which is under lower pressure than the remainder of the system, the liquid refrigerant will flash and expand into a gaseous state, thereupon absorbing heat from the media in which the evaporator is located. The low-pressure gas formed in the evaporator is thereupon recycled to the compressor. There are various ramifications of this refrigeration cycle, however, all of such systems to date work on the same principle of condensation, compression, and evaporation of refrigerants. Often, a surged drum is interposed between the condenser and evaporator to store the excess liquid refrigerant not required to use in the evaporator at any given condition.

In order to maintain the proper balance of gaseous and liquid refrigerant in the entire system, many refrigerant controls are employed. The evaporator is usually operated on a "dry wall" principle, and the condenser is usually operated on a "wet wall" principle. In order to maintain these conditions, an expansion valve is interposed between the condenser and evaporator to separate the gas from the liquid passing through the evaporator. In addition, certain controls are interposed in the line connecting the evaporator to the compressor or so-called "low-side line" in order to regulate the amount of gas being returned to the compressor. Bellow valves must often be interposed in the low-side line to prevent return of entrained liquid to the compressor. In addition, a surge drum is often used to collect the excess liquid refrigerant. These regulating valves are all operatively connected to the evaporator and operate, depending upon the external temperature conditons at the evaporator.

These controls, however, are not particularly effective and the condensed liquid entering the evaporator often contains entrained gas which may be due to momentary overloading of the condenser, or due to an increased load on the evaporator which would cause the system to start running "gassy." As the load requirements on the evaporator often vary considerably, depending upon the atmospheric conditions in the enclosure in which the evaporator is to be employed, temperature controls connected with the evaporator usually operate the valves interposed in the refrigerant lines. All of these controls operate on a spring operated principle or a bellow or expansion type valve principle. As these controls do not operate on a weight of gas to weight of liquid refrigerant principle, they are not particularly accurate, and, therefore, rather ineffective. Moreover, such controls are rather expensive and often break down after considerable use, thereby increasing the total cost of the refrigeration system.

It is, therefore, the primary object of the present invention to provide a single unitary control system, which will effectively control the amount of liquid and gaseous refrigerant to all components forming part of the refrigerant system.

It is another object of the present invention to provide a control system of the type stated which enables the evaporator to operate in a full-flooded condition.

It is an additional object of the present invention to provide a control system which will enable the condenser to operate on a dry-wall principle.

It is also an object of the present invention to provide a compressor which is operatively connected to the control system of the type stated and which is self-contained in an efficient and compact unit.

It is still another object of the present invention to provide a compressor and control system of the type stated which can be inexpensively manufactured in a small compact unit and which is highly efficient in operation.

With the above and other objects in view, my invention resides in the novel features of form, construction, arrangement, and combination of parts presently described and pointed out in the claims.

In the accompanying drawings (15 sheets):

Figure 1:
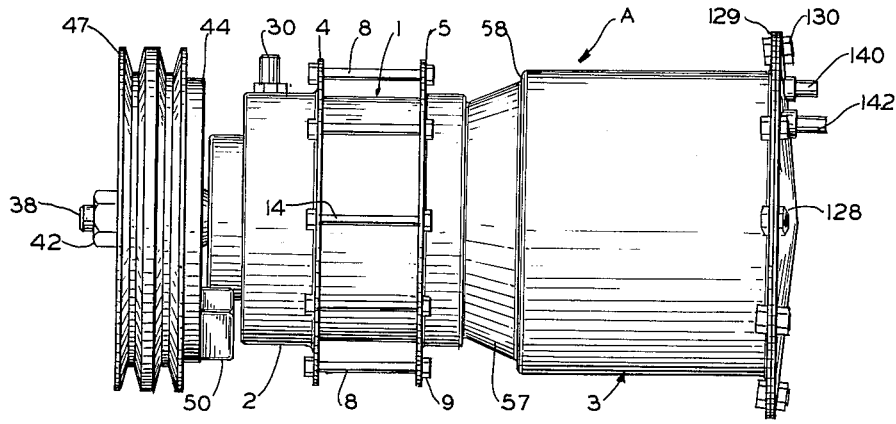
FIG. 1 is a side elevational view of the compressor and control system constructed in accordance with and embodying the present invention.
Figure 2:
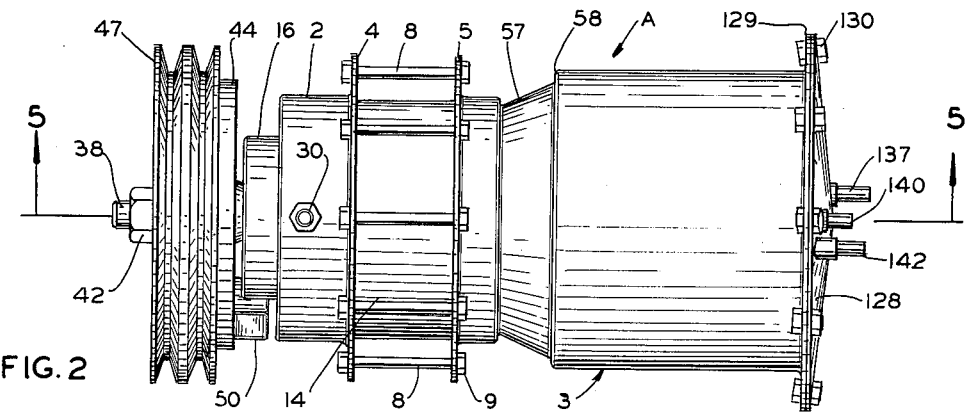
FIG. 2 is a top plan view of the compressor and control system constructed in accordance with and embodying the present invention.
Figures 3, 4:
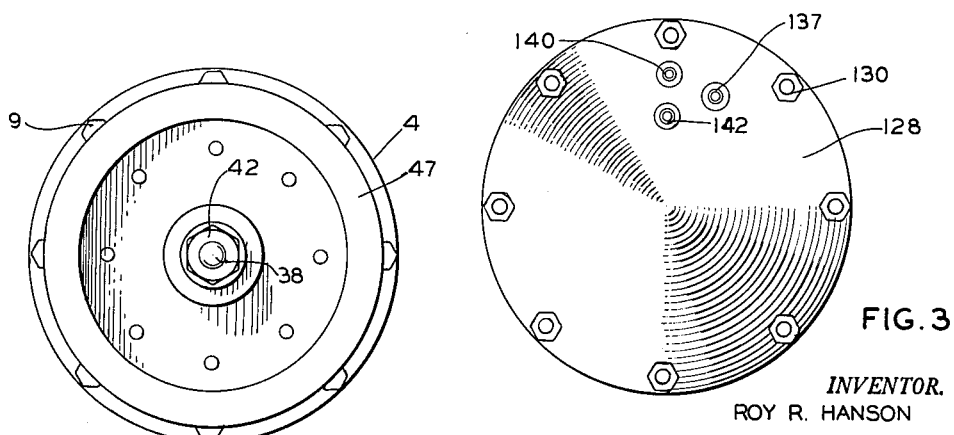
FIG. 3 is a right side elevational view of the compressor in FIGS. 1 and 2.
FIG. 4 is a left side elevational view of the compressor in FIGS. 1 and 2.
Figure 5:
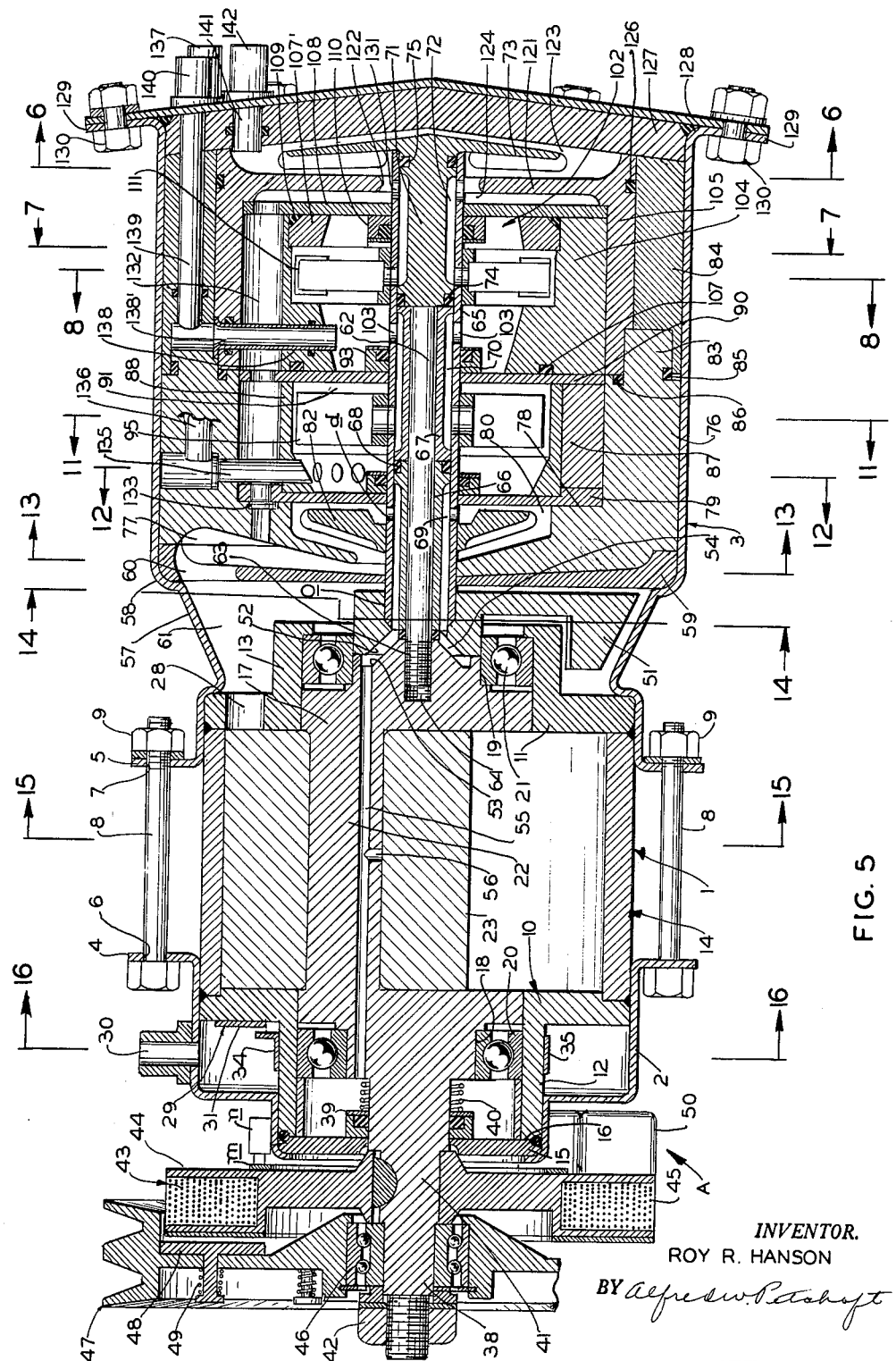
FIG. 5 is a sectional view taken along line 5—5 of FIG. 2.
Figure 16:
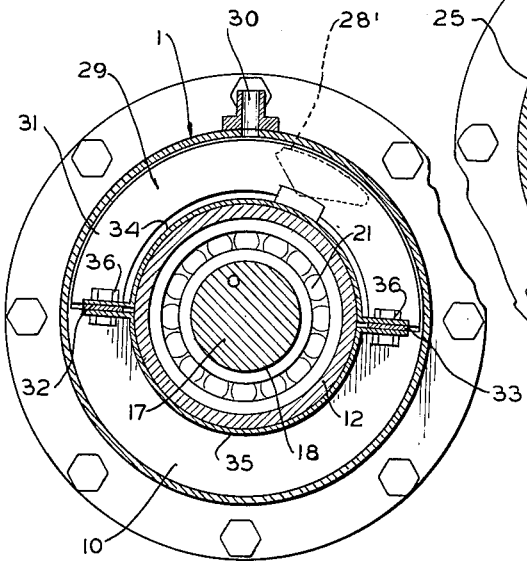
Figure 15:
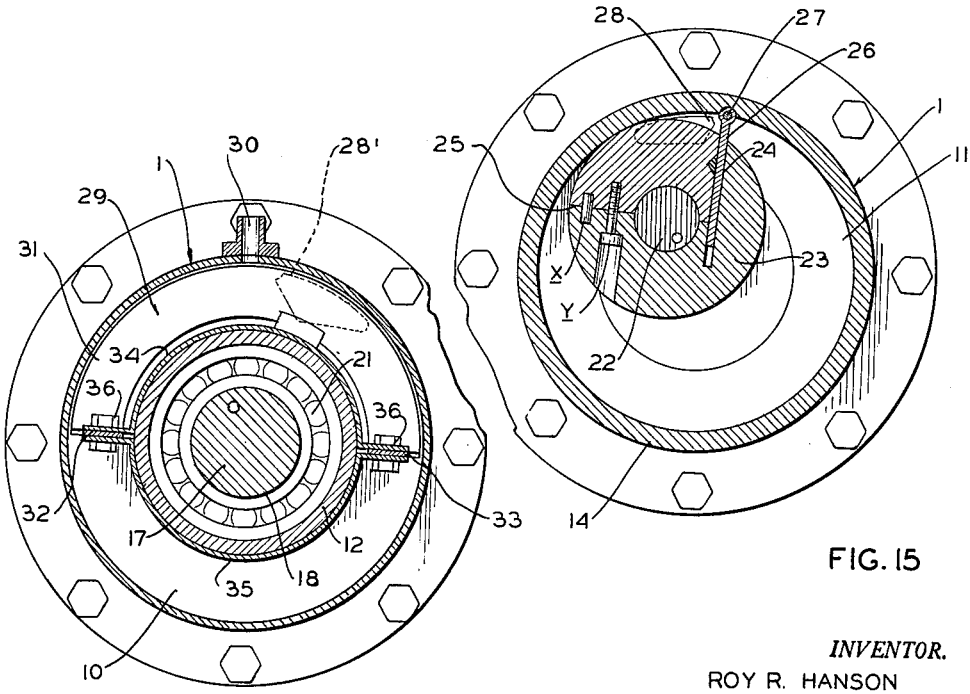
Figure 19:
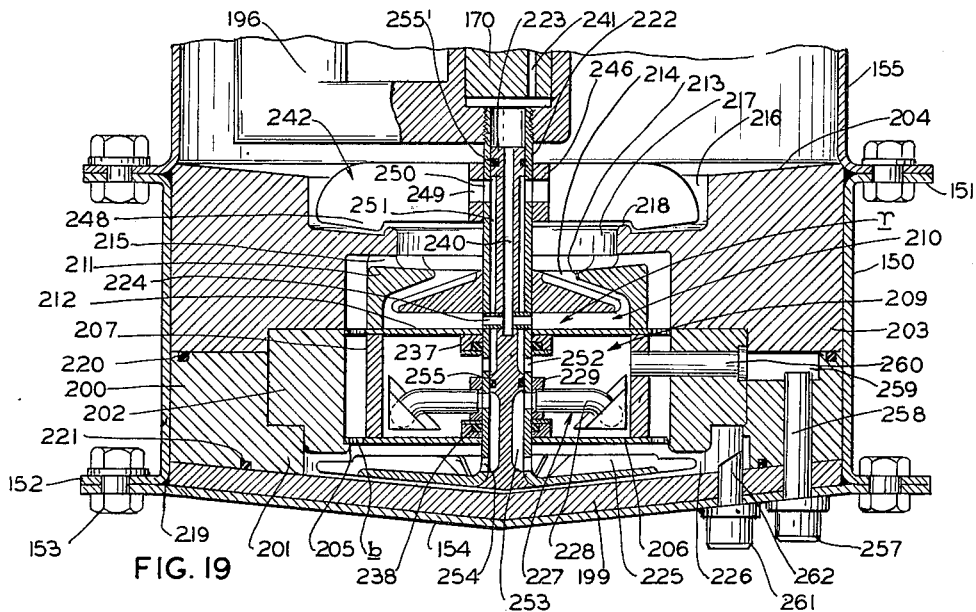
Figure 20:
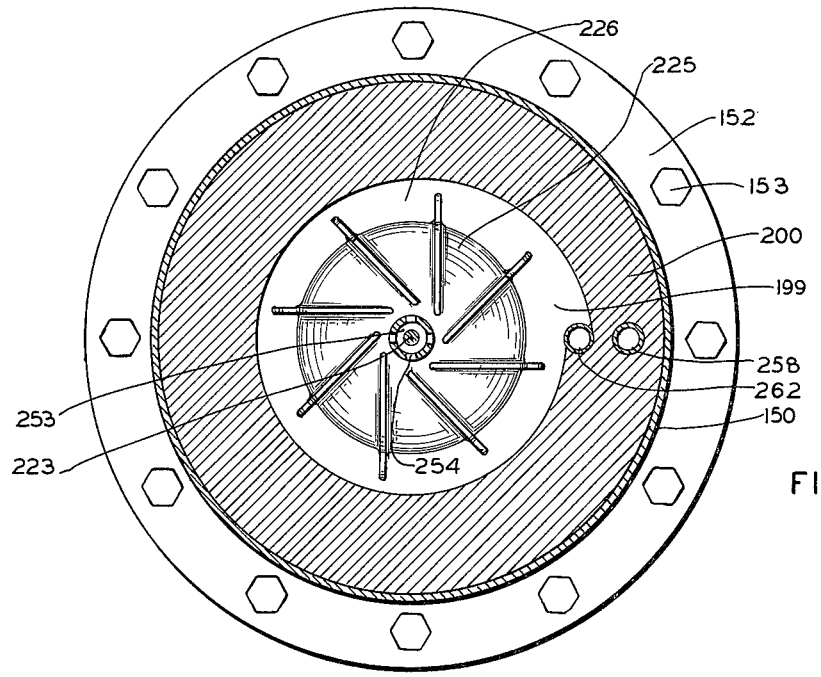
Figure 29:
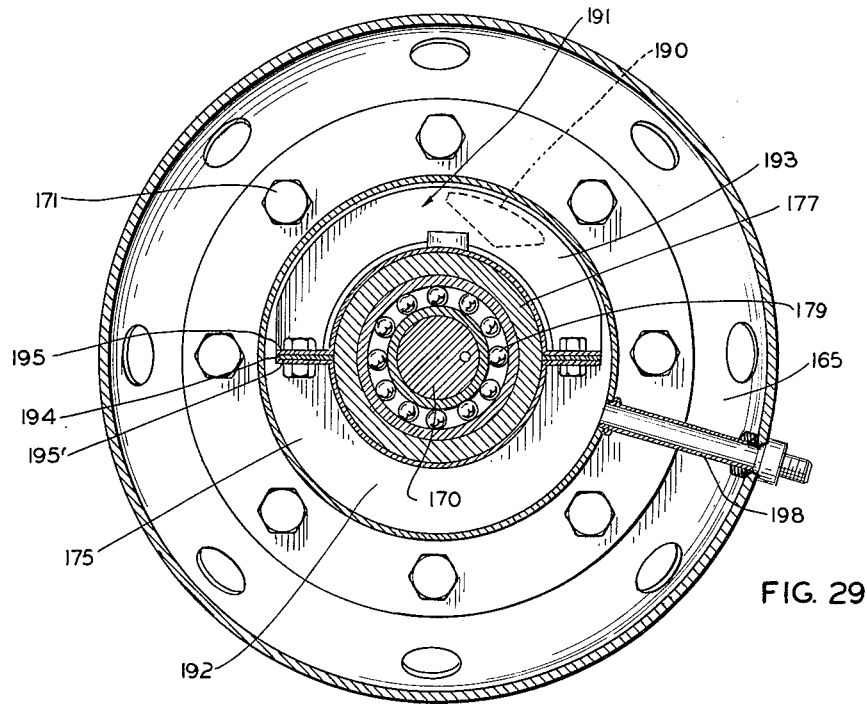
Figure 30:
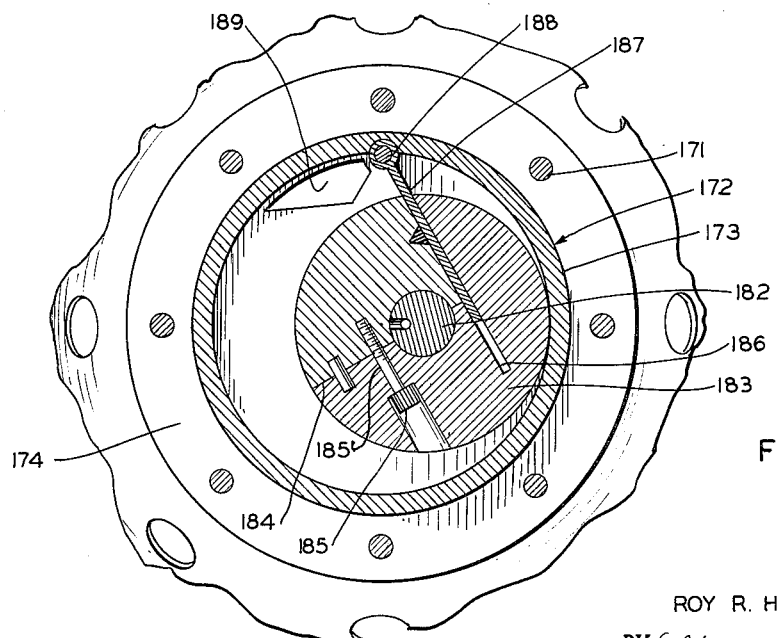
Figure 35:
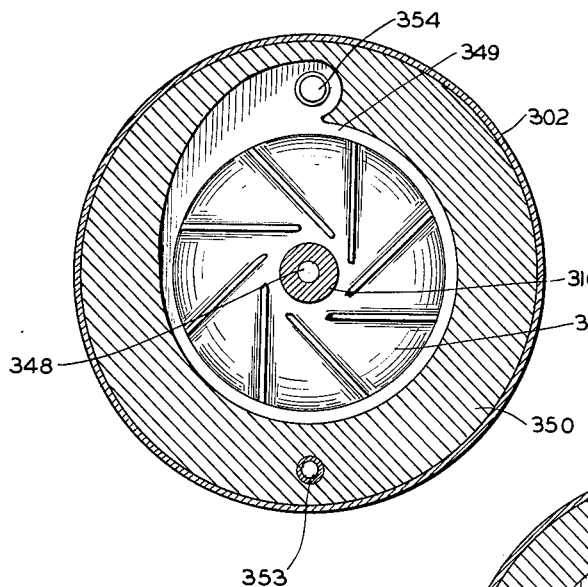
Figure 36:
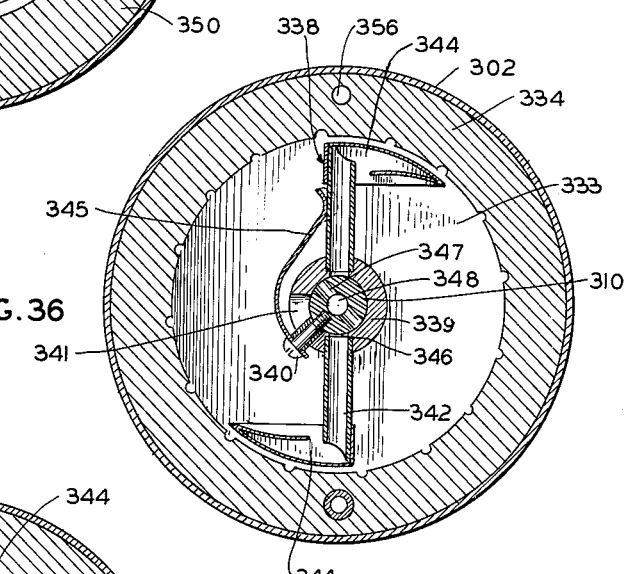
Figure 37:
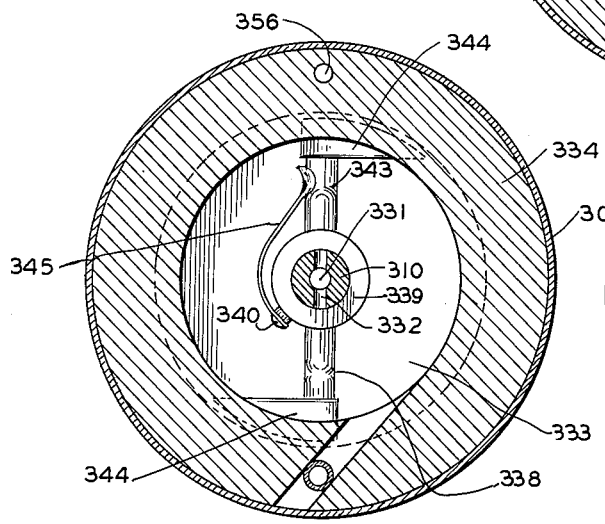
Figure 38:
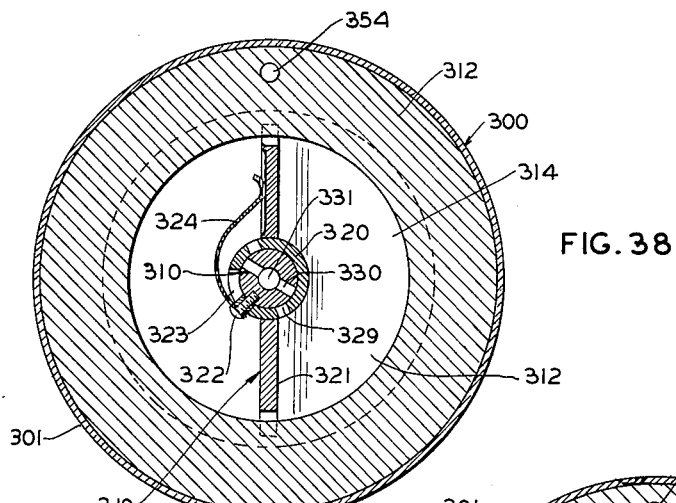
Figure 39:
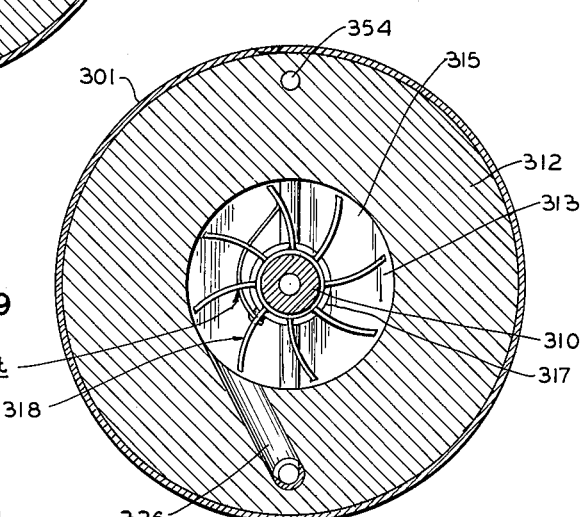
Figure 40:
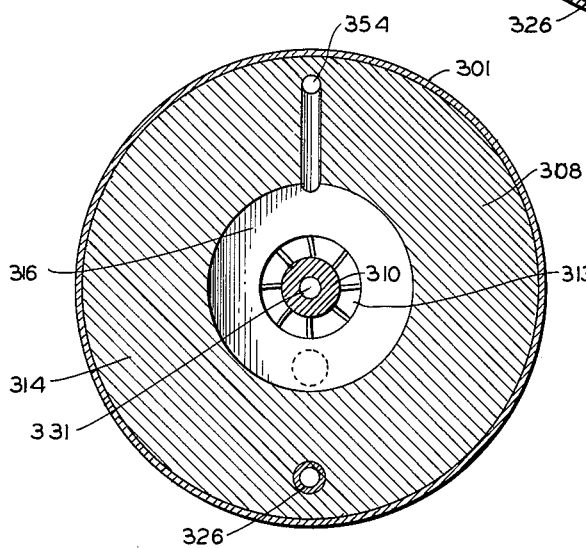
Figure 41:
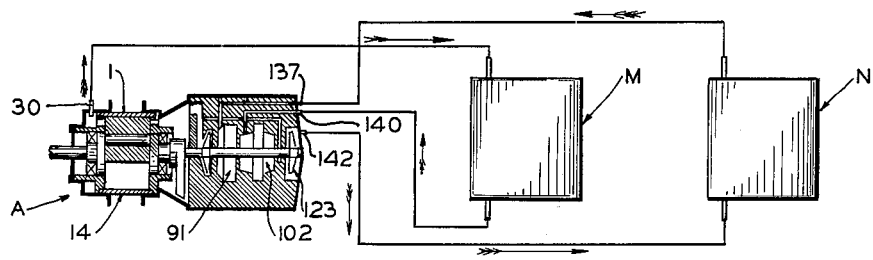
Figure 42:
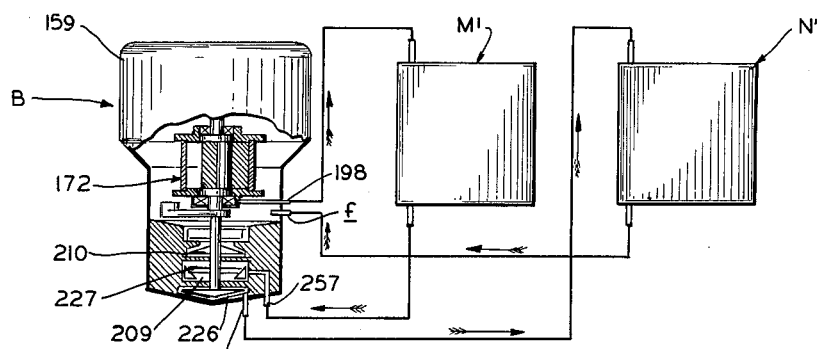
Figure 43:
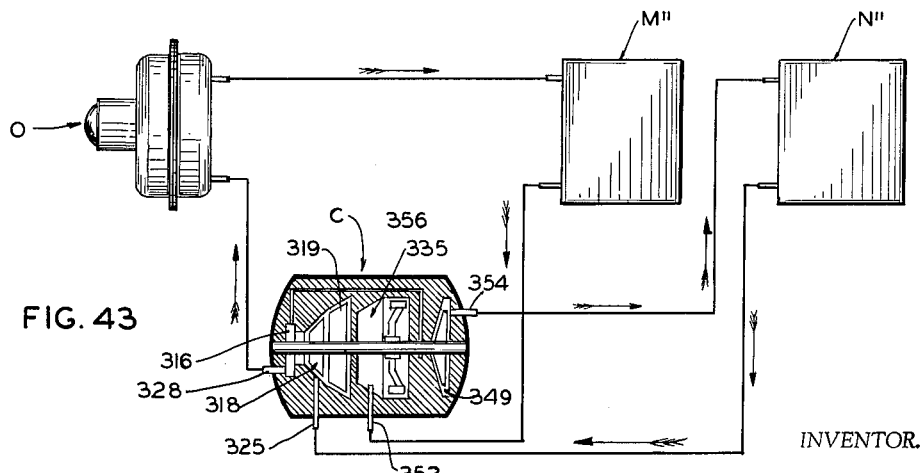

FIGS. 6, 7, and 8 are sectional views taken along lines 6—6, 7—7, and 8—8, respectively of FIG. 5;

FIGS. 9 and 10 are fragmentary sectional views taken along lines 9—9 and 10—10, respectively, of FIG. 8;

FIGS. 11, 12, 13, and 14, are sectional views taken along lines 11—11, 12—12, 13—13, and 14—14, respectively, of FIG. 5;

FIGS. 15 and 16 are fragmentary sectional views taken along lines 15—15 and 16—16, respectively, of FIG. 5;

FIG. 17 is a side elevational view of a modified form of a compressor and control system unit contructed in accordance with and embodying the present invention;

FIG. 18 is a sectional view taken along line 18—18 of FIG. 17;

FIG. 19 is a fragmentary sectional view taken along line 19—19 of FIG. 17;

FIGS. 20 and 21 are sectional views taken along lines 20—20 and 21—21, respectively, of FIG. 18;

FIG. 22 is a fragmentary sectional view taken along line 22—22 of FIG. 18;

FIGS. 23 and 24 are fragmentary sectional views taken along lines 23—23 and 24—24, respectively, of FIG. 22;

FIGS. 25 and 26 are sectional views taken along lines 25—25 and 26—26, respectively, of FIG. 18;

FIG. 27 is a fragmentary sectional view taken along line 27—27 of FIG. 18;

FIG. 28 is a fragmentary sectional view taken along line 28—28 of FIG. 27;

FIG. 29 is a sectional view taken along line 29—29 of FIG. 18;

FIG. 30 is a fragmentary sectional view taken along line 30—30 of FIG. 18;

FIG. 31 is a side elevational view of another modified form of a control device constructed in accordance with an embodying the present invention;

FIG. 32 is a right side elevational view of the control device shown in FIG. 31;

FIG. 33 is a left side elevational view of the control device shown in FIG. 31;

FIG. 34 is a vertical sectional view taken along line 34—34 of FIG. 32;

FIGS. 35, 36, 37, 38, 39, and 40 are sectional views taken along lines 35—35, 36—36, 37—37, 38—38, 39—39, and 40—40, respectively, of FIG. 34;

FIG. 41 is a diagrammatic view of the compressor and control means therefor showing the operative connection to a conventional condenser and evaporator;

FIG. 42 is a diagrammatic view of the modified form of compressor and control means therefor of FIG. 17 and showing the operative connection to a conventional condenser and evaporator; and FIG. 43 is a diagrammatic view of the control means of FIG. 31 and showing the operative connection to a conventional compressor, condenser, and evaporator.

Referring now in more detail and by reference characters to the drawings, which illustrate practical embodiments of the present invention, A designates a compressor and a unitary control means therefor, and which is designed primarily for use in air-conditioning and refrigeration systems for automotive vehicles. The compressor and control system A includes a compressor 1 which is interposed between and supported by a compressor support housing 2 and a control system housing 3. The housings 2 and 3 are formed from sheet metal stampings and integrally include matching outwardly extending flanges 4, 5, on their inner peripheral margins which are provided with apertures 6, 7, for accommodating bolts 8 secured by nuts 9, whereby the two housings 2, 3, are rigidly secured to each end of the compressor 1.

The compressor 1 comprises a pair of spaced circular end plates 10, 11, each integrally including outwardly extending bosses 12, 13, respectively, which are internally bored. The circular end plates 10, 11, are annularly grooved at their peripheral margins for the accommodation of a cylindrical compressor casing 14. The end plate 10 is further fitted with a retaining cap 15 which abuts the inwardly presented surface of an annular flange 16 integrally formed around the outer end of the compressor housing 2. Extending axially through the compressor 1 is a rotatable shaft 17 which is provided with diametrally reduced portions 18, 19, at each end for journaling in bearings 20, 21, which are mounted in the bosses 12, 13, respectively. The rotatable shaft 17 integrally includes a diametrally reduced offset or eccentrically located shaft 22 and rotatably mounted thereon is a cylindrical compressor rotor 23. By reference to FIG. 15, it can be seen that the rotor 23 is provided with a chordwise extending slot 24 exposed radially to the interior cylindrical surface of the casing 14 and fitted within the slot 24 is a thin flat compressor vein 26. The outer end of the vein 26 is pivotally mounted to the inwardly presented lateral surface of the end plate 10 by means of a pin 27. The rotor 23 is axially split along a slit or interface 25 to facilitate assembly on the shaft 22 and is held in such assembled position by pins $x$ and bolts $y$. Formed within the end plate 11 adjacent the upper peripheral margin thereof is a low-pressure inlet port 28 and formed within the end plate 10 is an annularly spaced high-pressure discharge aperture 28' which communicates through a check valve 29 with a high-pressure outlet port 30, integrally formed within the upper portion of the compressor support housing 2.

By reference to FIG. 16, it can be seen that the check valve 29 is formed of a resilient semi-cylindrical ring 31 which normally bears against and is disposed over the discharge aperture 28'. The resilient ring 31 is integrally formed with a pair of projecting tabs 32, 33, which are seated between a pair of semi-circular annular bands 34, 35, extending around the boss 12, the tabs 32, 33, being secured to the annular bands 34, 35, by means of bolts 36. The operation and structure of the compressor 1 is more fully described in the United States Letters Patent No. 3,001,384, and in copending application, Serial No. 102,060, filed April 10, 1961, and is, therefore, neither illustrated nor described in detail herein.

The diametrally reduced portion 18 of the shaft 17 integrally merges into a co-axial stub shaft 38 and extends forwardly of the housing 2 through an aperture formed in the retaining cap 15. An annular sealing ring 39 is mounted on the stub shaft 38 inwardly of the retaining cap 15 and biased thereagainst by means of a compression spring 40 which also bears against the diametrally reduced portion 18. Mounted on a diametrally reduced portion 41 of the stub shaft 38 and retained thereon by means of a nut 42 is a conventional electromagnetic clutch 43, including a flywheel 44, having a circumferential or annular electromagnetic coil 45, the flywheel 44 being keyed to the diametrally reduced portion 41 of the stub shaft 38. Journaled on the reduced portion 41 by means of bearings 46 is a V-belt pulley 47 having a rearwardly facing annular clutch ring 48 which is forwardly spring-biased (reference being made to FIG. 5) by means of compression springs 49, and trained around the pulley 47 is a V-belt (not shown) whereby the pulley may be driven by a suitable prime mover such as an automobile engine (not shown). The clutch 43 is normally disengaged and the belt-driven pulley 47 is freely rotatable on the reduced portion 41. Rigidly secured in any suitable manner upon the exposed lateral face of the flywheel 44 is an annular electrically conductive commutation ring $m$ which is in operative contact with a conventional contactor brush $n$. The housing 2 can be conventionally grounded and the brush $n$ connected to a suitable remotely located manual control switch by conventional circuitry so that a circuit can be completed to energize the electromagnetic coil 45. Inasmuch as this switch and circuitry is conventional and in and of itself forms no part of the invention, it is not shown or described in detail herein. It will, of course, be obvious to one familiar with refrigeration devices that such a control switch can be thermostatically operated rather than manually operated if desired and the use of such thermostatic control switch is also conventional in the refrigeration art. Whenever the electromagnetic coil 45 is energized, it will pull the clutch ring 48 axially toward it against the resistance of the compression springs 49, and thereby establish mechanical connection between the pulley 47 and the shaft 41 so that rotative or driving force is transmitted from the pulley 47 to the shaft 41.

In order to compensate for the weight of the eccentrically located shaft 22, a counterweight 50 is mounted on the rearwardly presented surface of the flywheel 44. Similarly, a counterweight 51 having an aperture $o$ which merges into an inwardly tapering section 52 at its forward margin is mounted on a frusto-conical abutment 53, integrally formed on the rearward end of the shaft 17, and is also journaled in the bearings 21. The tapered section 52 is disposed slightly rearwardly of the frusto-conical abutment 53 defining an annular oil passageway 54 which communicates with the bearing 21 so that it is practically flooded with oil. The bearings 20 are lubricated through an oil capillary tube 55 formed within the rotatable shaft 17 and eccentrically located shaft 22, and which communicates with the annular passageway 54. The rotor 23 is lubricated through an oil capillary tube 56 drilled radially in the shaft 22 and which communicates with the capillary tube 55, all as can best be seen in FIG. 5.

The control system housing 3 is formed with a inwardly tapering section 57 at its forward end defining an annular shoulder 58. Disposed within the housing 3 and abutting the shoulder 58 is a cylindrical retaining disk 59 which is arcuately grooved along its upper margin to form a flash gas aperture 60, the disk 59 forming a low-pressure gaseous refrigerant chamber 61 communicating with the inlet port 28 on the compressor 1. A rotatable shaft 62, having a diametrially reduced threaded forward end 63, extends axially through the housing 3 and is secured within an internally threaded bore 64, formed within the abutment 53. In this connection, it is to be noted that the direction of threading on the threaded end 63 should be opposite to shaft rotation so that the shaft 62 is, in effect, self-tightening.

Disposed around and concentrically encircling the shaft 62 is an outer sleeve 65 and disposed within and extending axially through the sleeve 65 are two endwise abutting inner sleeves 66, 67, which are disposed around the shaft 62, the sleeve being internally grooved at its rearward end for accommodating an annular sealing ring 68. The sleeve 66 is further annularly grooved to provide an oil passageway 69 which communicates with the oil passageway 54 and the sleeve 67 is annularly grooved intermediate its ends to provide a liquid refrigerant bypass 70. The shaft 62 is provided with a diametrally enlarged rearward portion 71 which is internallly grooved intermediate its ends to provide a bypass duct 72 for liquid refrigerant, and integrally merges at its rearward end with an impeller blade 73. The enlarged portion 71 is further internally grooved at its forward and rearward ends for accommodating annular sealing rings 74, 75, respectively.

The retaining disk 59 is provided with a dish-shaped rearwardly presented surface for accommodating a tubular support casing 76 which is centrally bored and which is provided with an elongated recess 77 near its upper margin, providing communication to the low-pressure gaseous refrigerant chamber 61. The bore of the tubular casing 76 is diametrally enlarged at its rearward end defining an annular shoulder 78 and disposed within the bore and adapted for tight-fitted seating against the shoulder 78 is a circular plate 79 forming the end plate of an oil reservoir 80. Integrally formed on the outer sleeve 65 within the oil reservoir 80, and adapted for rotative movement therewith is an impeller blade 82 which serves as an oil pump. Communication is provided between the reservoir 80 and the oil passageway 69 through radial apertures d formed within the sleeve 65. The support casing 76 is integrally provided with a rearwardly extending annular tongue 83 which is adapted to engage an annular groove formed within the forwardly presented surface of an outer tubular support sleeve 84, the tongue 83 being internally grooved on each of its annular surfaces for accommodating sealing rings 85, 86.

Mounted within the bore of the support casing 76 and abutting the rearward surface of the plate 79 is a capacity control support sleeve 87, and disposed within the bore of the support sleeve 87 and abutting the rearwardly presented surface of the plate 79 is an overflow chamber casing 88 which has an inwardly tapering forward end 89. An end plate 90 abuts the rearwardly presented lateral face of the support sleeve 87 defining a low-side liquid overflow chamber 91. The chamber casing 88 is further provided with a plurality of low-pressure gas apertures a adjacent its upper portion which communicate with the low-pressure gaseous refrigerant chamber 61. Annular sealing rings 92, 93, are mounted on the sleeve 65 and abut the rearward margin of each of the plates 79, 90, respectively.

Figure 11:
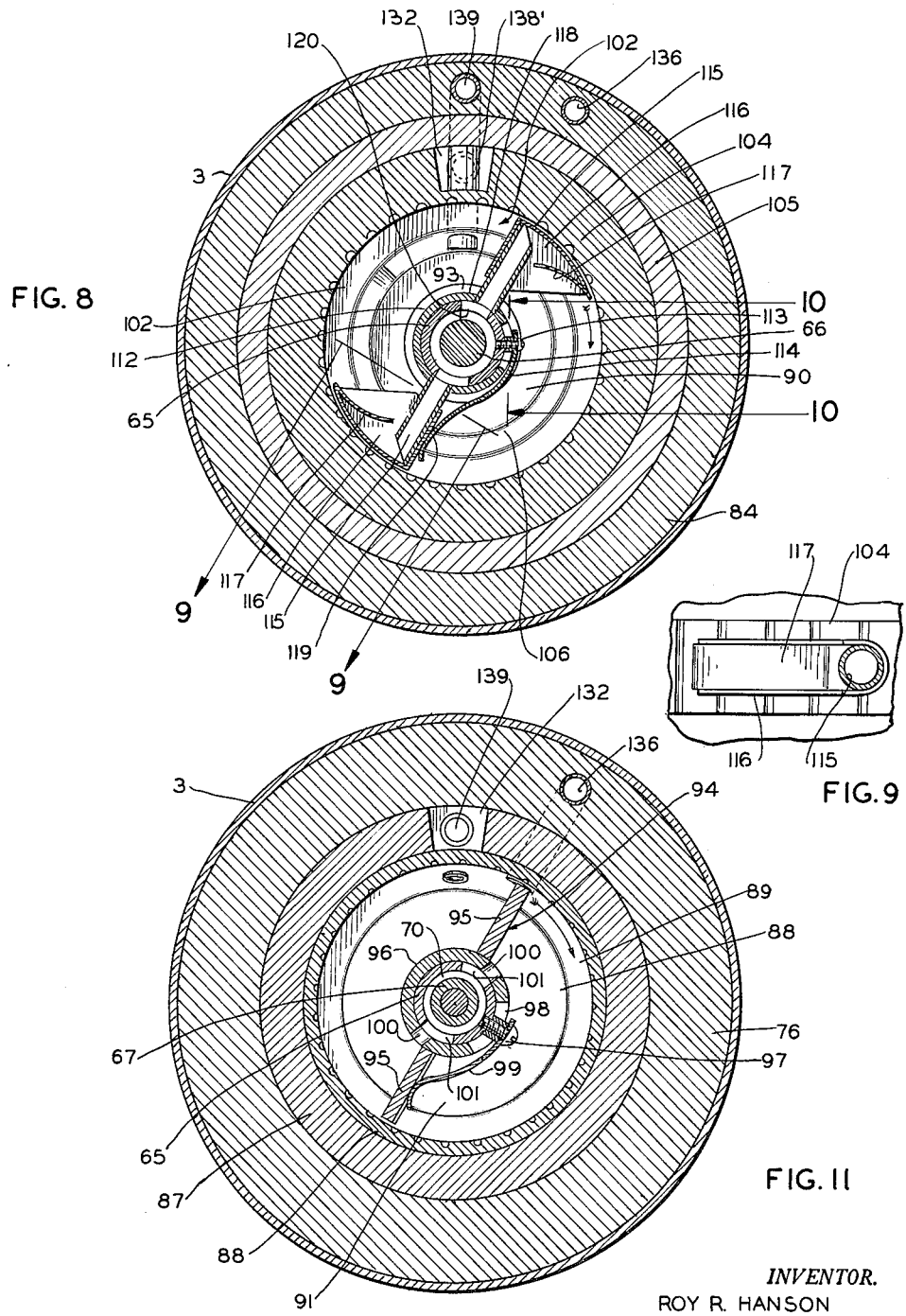
Figure 12:
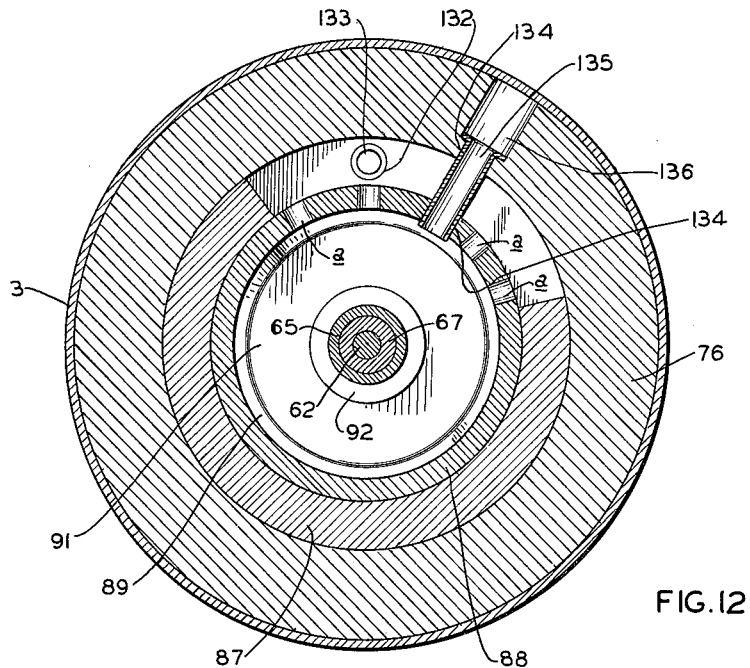
Figure 13:
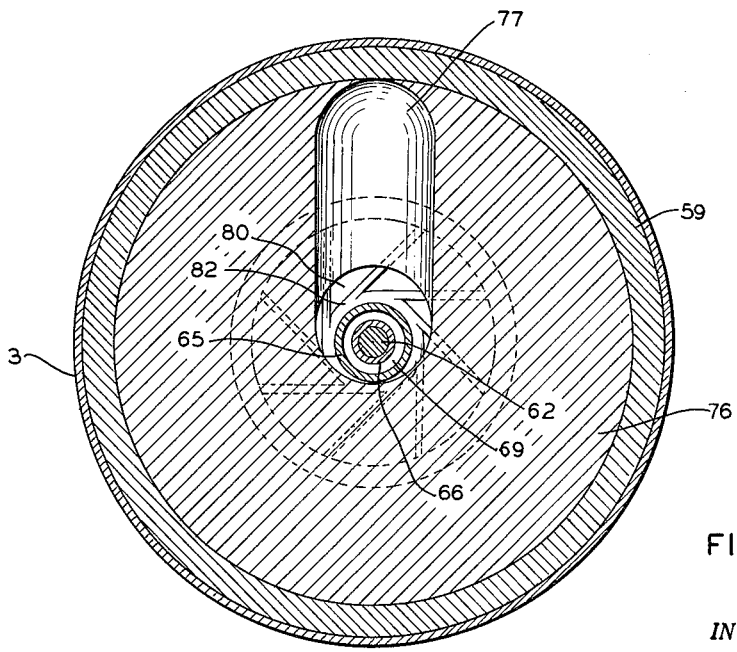
Figure 14:
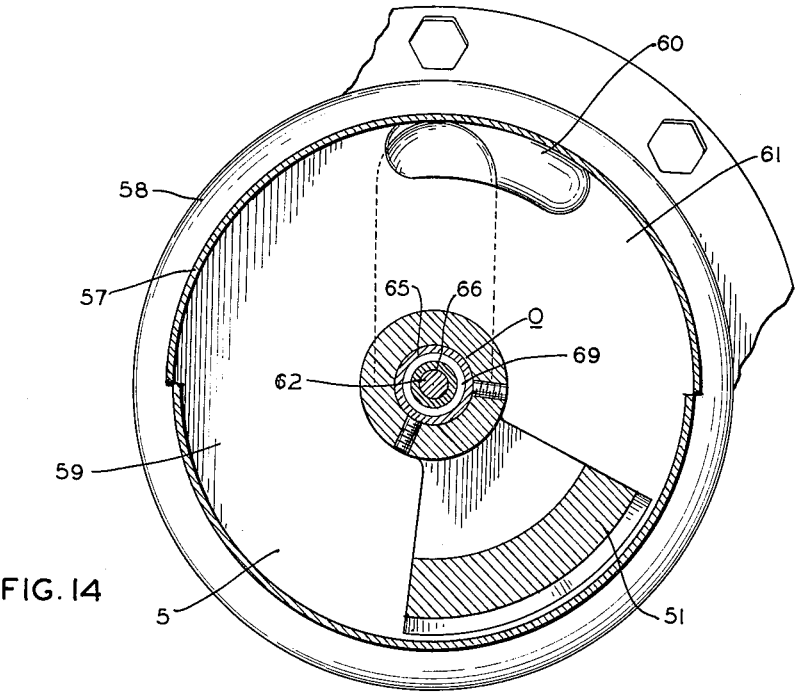

Mounted within the low-side liquid overflow chamber 91 is a refrigerant capacity control 94 which includes a pair of radially opposed rectilinear paddle arms 95 secured to a support ring 96 which is, in turn, mounted on the outer sleeve 65 by means of a set screw 97, the set screw 97 being movable within a groove 98 formed within the ring 96. Biasing the paddle arms 95 in the direction of rotation of the shaft 62 is a resilient spring-band 99 which is secured to the sleeve 65 by means of the set screw 97, all as can best be seen in FIG. 11. The interior surface of the liquid overflow chamber casing 88 should preferably be serrated to prevent the liquid refrigerant within the chamber 91 from orbiting caused by rapid angular rotation of the rotating paddle arms 95. The paddle ring 96 is provided with a plurality of radial apertures 100 which will communicate with radial apertures 101 formed within the sleeve 65 when the paddle ring 96 is rotated against the action of the spring-band 99, substantially as shown in FIG. 11. Thus, when the apertures 100 are aligned with the radial apertures 101, communication is provided between the liquid overflow chamber 91 and the refrigerant bypass 70 through which gaseous refrigerant may flow.

The liquid refrigerant bypass 70 also communicates with a high side liquid refrigerant chamber 102 through apertures 103 formed within the sleeve 65. The chamber 102 is defined by a chamber casing 104 which is mounted within the central bore of a support sleeve 105 which is, in turn, carried by the outer sleeve 84, substantially as shown in FIG. 5. The casing 104 is provided with an inwardly tapering section 106 and is internally grooved on its forwardly presented surface for the accommodation of an annular sealing ring 107. The bore of the chamber casing 104 is slightly diametrally enlarged at its rearward end for accommodating an annular support ring 107' and disposed against the support ring 107' in endwise abutment is an end plate 108, the support ring 107' being internally grooved for accommodating an annular sealing ring 109. Also mounted on the sleeve 65 forwardly of the end plate 108 is an annular sealing ring 110.

Disposed within the high-side liquid refrigerant chamber 102 is a liquid refrigerant throttle control 111 which includes a support ring 112 mounted on the sleeve 65 by means of a set screw 113 through an elongated slot 114 formed within the ring 112. Integrally formed on and extending radially outwardly from the ring 112 is a pair of radially opposed scoop arms 115 and rigidly secured to the ends of each of the arms 115 are liquid refrigerant scoops 116. The scoops 116 have forwardly facing inlets in the direction of rotation of the sleeve 65 and each include a liquid retaining plate 117, substantially as shown in FIGS. 7 and 8. The scoop arms 115 furthermore are hollow and communicate with radial apertures 118 formed within the support ring 112. The scoop arms 115 are biased in the direction of shaft rotation by means of a resilient spring-band 119 secured to the sleeve 65 by means of the set screw 113. When the scoop arms 115 are biased against the action of a spring-band 119 by liquid refrigerant accumulating in the chamber 102, the radial apertures 118 will become aligned with valve apertures 120, formed within the sleeve 65 and the highside liquid refrigerant chamber 102 will communicate with the bypass duct 72.

The support sleeve 105 includes an inwardly extending oil separator disk 121 having a central aperture 122 which provides communication between a liquid refrigerant pumping chamber 123 and an oil separation chamber 124. The support sleeve 105 is further internally grooved for accommodating an annular sealing ring 126. A retaining disk 127 is disposed within the housing 3 and abuts the rearwardly presented end of the outer sleeve 84, and finally, an end plate 128 is secured to outwardly extending flanges 129, integrally formed on the housing 3 by means of bolts 130. The high-side chamber 102 further communicates with the pumping chamber 123 through radial apertures 131 formed within the sleeve 65 adjacent the aperture 122 formed within the oil separator 121.

The support casing 76, the liquid overflow chamber casing 88, the high-side chamber casing 104, and the end plates 79, 90, and 108, are axially bored to provide a flash gas and oil passageway 132, substantially as shown in FIG. 5. A pipe fitting 133 is inserted within the portion of the passageway 132 within the casing 76. The casing 76, the support sleeve 87, and the liquid overflow chamber casing 88 are provided with a radial bore 134 and inserted therein is a low-side gas pipe 135 which communicates with a low-pressure gas return line 136 inserted in an axial duct 136' formed axially within the casing 76 and sleeve 84, the gas return line 136 terminating in a pipe fitting 137 which is connected to a conventional evaporator N. The tongue 83 of the casing 76, the support sleeve 105, and the high-side chamber casing 104 are also provided with a radial bore 138 for accommodating a liquid refrigerant pipe 138′, the bore 138 communicating with an axial liquid refrigerant line 139 which terminates in a pipe fitting 140, which is, in turn, connected to a conventional condenser M. Finally, the end plate 128 and the retaining disk 127 are axially drilled to accommodate a high-pressure liquid outlet line 141, terminating in a pipe fitting 142.

The control unit forming part of the compressor and control means A can be conveniently and easily assembled in the following manner. The retaining disk 59 is inserted into the housing 3 adjacent its open rearward end. The support casing 76 is thereupon inserted and urges the retaining disk 59 within the housing 3. The outer sleeve 65 is then disposed axially within the housing 3 until the forward end thereof is fitted within the aperture o of the counterweight 51. As the impeller blade 82 is integrally formed with the forward end of the sleeve 65, it is carried therewith. The pipe fitting 133 is then inserted with the flash gas and oil passageway 132 which is formed within the casing 76. The end plate 79 is then inserted within the housing 3 concentrically encircling the sleeve 65 until it abuts the shoulder 78, forming part of the casing 76, and is followed by the annular sealing ring 92. Thereupon, the support sleeve 87 is inserted within the bore of the casing 76 until it abuts the rearward margin of the end plate 79. The liquid overflow casing 88 is next inserted within the bore of the sleeve 87 until it abuts the rearwardly presented surface of the end plate 79, the capacity control 94 is thereupon mounted upon the outer sleeve 65 and tightened by the set screw 97, and the liquid overflow chamber 91 is enclosed by then inserting the end plate 90. The low-side gas pipe 135 is inserted through the bore 134, so that its inner end opens into the liquid overflow chamber 91. Followed by the end plate 90 is the sealing ring 93 which is disposed around the sleeve 65 until it abuts the rearward margin of the end plate 90, and the high-side liquid refrigerant chamber casing 104 is then disposed within the housing 3 urging the other pre-assembled components forwardly therein. The throttle control 111 is mounted upon the sleeve 65 by tightening the set screw 113. The sealing ring 110 is disposed around the sleeve 65, the support ring 107 is inserted within the bore of the enlarged portion of the casing 104, and the high-side liquid refrigerant chamber 102 is then enclosed by inserting the end plate 108. Thereupon, the support sleeve 105 is inserted in the housing 3 and the high-pressure liquid refrigerant pipe 138′ is radially disposed within the bore 138. The support sleeve 84 is next inserted within the housing 3 and interposed between the sleeve 105 and the wall of the housing 3, substantially as shown in FIG. 5. The rotatable shaft 62 is next installed by inserting the two sleeves 66, 67, axially within the outer sleeve 65 in endwise abutting relationship, and the shaft 62 is thereupon inserted within the sleeves 66, 67, and threadedly connected to the abutment 53, by turning the impeller blade 73 in a direction opposite to shaft rotation so that the shaft 62 will, in effect, be self-tightening. Finally, the retaining disk 127 is inserted within the housing 3 and the end plate 128 is then secured to the flanges 129 by means of the bolts 130. In this connection, it is to be noted that the size of the housing 3 is such that the end plate 128 will fit snugly against the rearwardly presented surface of the retaining disk 127. Finally, the low-side gas pipe 136 is inserted in the bore 136′.

In use, the belt-driven pulley 47 is connected to a suitable prime mover (not shown). Thereupon, the outlet port 30 is connected to the condenser M, forming part of the refrigeration system and the pipe fitting 137 of the low-pressure return line 136 is connected to the exhaust side or discharge side of the evaporator N. The pipe fitting 142, forming part of the liquid refrigerant line 141, is connected to the inlet side of the evaporator N and the pipe fitting 140, forming part of the liquid refrigerant line 139, is connected to the discharge side of the condenser M.

Upon engagement of the clutch 43, power will be transmitted through the rotatable shaft 17, through the eccentrically located shaft 22, and to the rotor 23 of the compressor 1. During rotation of the rotor 23, the low-pressure gaseous refrigerant within the low-pressure chamber 61 will be drawn into the compressor 1 through the inlet port 28. The vein 26 will compress the gaseous refrigerant in the chamber formed by the rotor 23, the cylindrical casing 14, and the end plates 10, 11, to condenser pressure, where the check-valve 29 will thereupon be forced open, permitting the high-pressure gaseous refrigerant to pass through the outlet port 30 into the condenser M. The operation of the compresser 1 is more fully described in the above-mentioned United States Letters Patent No. 3,001,384, and copending application, Serial No. 102,060, filed April 10, 1961, and is, therefore, not fully described in detail herein.

The check-valve 29 will prevent the compressor 1 from working against the high-side pressure during the whole refrigeration cycle. The gaseous refrigerant which has been pressurized to a point below its critical pressure is thereupon delivered to the condenser M where it is condensed to a liquid state and returned to the control unit through the pipe fitting 140. The liquid refrigerant is thereupon carried through the pipe 138′ into the high-side liquid refrigerant chamber 102. As the liquid refrigerant collects within the chamber 102, the refrigerant will be picked up by the scoops 116, and retained by the plate 117. As can be seen by reference to FIG. 8, if only a small amount of liquid refrigerant is present within the chamber 102, the mass of such liquid will not be sufficient to force the arms 115 backward against the action of the spring-band 119. Thus, the apertures 118 in the support ring 112 will not be aligned with the aperture 120 maintaining the chamber 102 under condenser pressure. As liquid refrigerant is continually supplied to the chamber 102 and the scoops 116 pick up a sufficient amount of the liquid refrigerant, the arms 115 will be forced backwardly with respect to the direction of the shaft 62 against the action of the spring-band 119. The mass liquid, at the particular velocity, will produce an inertia reaction which will cause the radial arms 115 to deflect and align the apertures 118, 120. It is to be noted in this connection that the serrated surface of the casing 104 will prevent the liquid refrigerant from orbiting within the chamber 102. As the apertures 118, 120, are thereupon aligned, the refrigerant will be forced through the hollow radial arms 115 and through the bypass duct 72 into the pumping chamber 123. At this point, any entrained oil carried within the refrigerant will be separated at the oil separator 121, as the two liquids are immiscible. The rotation of the impeller blade 73 will pump the liquid refrigerant out through the liquid refrigerant line 141 to the inlet side of the evaporator N. Meanwhile, the entrained oil which has collected in the chamber 124 will be returned through the passageway 132 to the oil reservoir 80. The rotation of the impeller blade 82 will, in effect, pump the oil from the oil reservoir 80 through the apertures d, to the oil passageway 69, and thence to the oil passageway 54, where the oil will be delivered to the bearings 21. Lubricating oil will also pass through the oil capillary tube 55 for lubrication of the bearings 20, and the rotor 23 will be lubricated through the capillary tube 56.

As long as the condensed liquid is entirely liquid, it will flow through the control means into the high-side liquid refrigerant chamber 102. If the liquid refrigerant accumulates therein, the apertures 118, 120, will become aligned in the manner previously described permitting the liquid refrigerant to flow into the pumping chamber 123. The liquid refrigerant is thence delivered to the evaporator N, causing a full-flooded condition. However, if the condensed liquid returning from the condenser M contains entrained gas, which may be due to a momentary overloading on the condenser M or to an increased load on the evaporator N, the system will begin to run "gassy." Gaseous refrigerant entrained with the liquid refrigerant will be delivered to the high-side chamber 102. The rotating arms 115 will separate the gas from the liquid, where the gas will begin to spin around the chamber casing 104 under centrifugal force. Actually, the liquid flow will not be entirely cut off to the evaporator N, and the net effect of the high-pressure gas in the chamber 102 will cause a pressure build-up throughout the entire condensing system, which, of course, produces a higher degree of liquification of the refrigerant. This will, in effect, counteract the gassy condition so that the high-side of the system undergoes a sufficient pressure increase to increase condensation in the condenser M and generally more liquid refrigerant. If sufficient liquid is continuously delivered to the chamber 102, the angular rotation of the arms 115 will be retarded thereby maintaining alignment of the apertures 118, 120, which will, in effect, maintain communication between the high-side chamber 102, the pumping chamber 123, and evaporator N. At this point, it is to be noted that the gaseous refrigerant in the chamber 102 will not be permitted to expand into the low-side overflow chamber 91, as the valve-apertures 100, 101, are normally biased to a closed position. When the pressure in the condensing system builds up, a greater supply of liquid refrigerant will be delivered to the high-side liquid refrigerant chamber 102 through the pumping chamber 123, and into the evaporator N, causing the system to run normal.

However, if the system should become "liquid-starved," less liquid refrigerant will be delivered to the high-side chamber 102 causing a thinner film of liquid on the walls of the casing 104. Consequently, the scoops 116 will pick up less liquid and the inertia-reaction caused by the mass of the liquid will not be sufficient to deflect the arms against the action of the spring-band 119 preventing alignment of the radial valve-apertures 118, 120. This will, of course, reduce the delivery of liquid refrigerant to the pumping chamber 123 and to the evaporator N, causing the system to again run "hot."

The high-pressure build up within the high-side chamber 102 will again cause the condenser M to condense more liquid refrigerant. This will, in effect, cause a greater amount of liquid refrigerant to be supplied to the high-side chamber 102. As the liquid refrigerant collects on the walls of the high-side chamber 102, the valve-apertures 118, 120, will thereupon again become aligned, providing communication to the pumping chamber 123 and the evaporator N.

After the liquid refrigerant within the evaporator N has flashed to a low-pressure gaseous state, this gas is returned to the liquid overflow chamber 91 through the low-side gas line 136. The gas will pass through the apertures a and into the low-pressure chamber 61, where it is thereupon re-introduced into the compressor 1 completing the refrigeration cycle. If, however, the low-pressure gas from the evaporator N contains any entrained liquid, the liquid will separate from the gas in the liquid overflow chamber 91, and the gas will be passed to the low-side chamber 61 through the apertures a. The liquid will, of course, collect on the wall of the chamber casing 88. If a sufficient amount of liquid refrigerant has collected, the mass of this refrigerant will impede the rotation of the paddle arms 95 causing the same to be urged backwardly with respect to the direction of shaft rotation, thereby aligning the apertures 100, 101. This will permit the high-pressure gas within the chamber 102 to pass through the apertures 103 and into the chamber 91 reducing the pressure within the high-side chamber 102. As a result thereof, the back pressure on the condenser will decrease causing less liquid to be delivered to the high-side chamber 102 and to the evaporator N. This flow of liquid refrigerant to the evaporator N will diminish until the evaporator N begins to run "cold."

As can be seen, the capacity control 94 and the liquid refrigerant throttle control 111 are modulating in their operation and will accurately maintain the capacity of the evaporator in balance with the load. Such control modulation permits the evaporator N to operate on a full-flooded condition and the condenser M to operate on a dry-wall basis, which has been found to effect heat-transfer coefficients producing higher efficiency in heat-transfer and, therefore, high efficiency in operation.

It is possible to provide a modified form of compressor and control means B, substantially as shown in FIGS. 17–30, and which includes an outer control systetm housing 150 having an integrally formed annular flange 151 extending around the periphery of its upper margin, and an integrally formed annular flange 152 extending around the periphery of its lower margin, and bolted to the flange 152 by means of bolts 153 is a dish-shaped bottom plate 154. Bolted to and supported by the flange 151 is an outer compressor housing 155 which includes an upper outwardly tapering section 156 which integrally emerges into a peripheral flange 157. Bolted to and supported by the flange 157 is a conventional A.C. electric motor 158 having a cylindrical stator casing 159 which integrally includes a dish-shaped top wall 160 and depending cylindrical side wall 161. Integrally formed on the lower margin of the side wall 161 is a peripheral flange 162 sized for matching engagement with the flange 157 and for accommodation of bolts 163, thereby enclosing the motor 158 in an hermetically sealed low-pressure chamber 164.

Rigidly secured to and extending around the stator casing 159 is a circular cross-plate 165 having an axially upstanding peripheral flange 166 and a long central aperture 167. The electric motor 158 includes a field winding 168 which is supported by the flange 166 within the stator casing 159 and disposed axially within the field winding 168 and adapted for rotative movement therein is an armature 169 which is mounted on and keyed to a coaxially extending shaft 170.

Mounted on the underside of the cross-plate 165, by means of bolts 171, is a compressor 172 which includes a cylindrical compressor casing 173 and upper and lower spaced end plates 174, 175, which are provided with outwardly extending bosses 176, 177, respectively. The bosses 176, 177, are further internally bored for accommodating bearings 178, 179, respectively.

The end plates 174, 175, are each annularly grooved to accommodate annular sealing rings 180, 181. The rotatable shaft 170 is journaled in each of the bearings 178, 179, and is provided with a diametrally offset or eccentrically located shaft portion 182 within the compressor casing 173. Rotatably mounted on the offset portion 182 is a cylindrical compressor rotor 183. The rotor 183 is axially slit along an interface 184 to facilitate assembly on the offset portion 182 and held in the assembled position by bolts 185, and pins 185'. Also formed within the rotor 183 is a slot 186 for the slide-fitting reception of a thin flat compressor vein 187, the outer radial end of which is pivotally mounted to the end plate 174 by means of a pin 188, all as can best be seen in FIGS. 18 and 30. Formed within the end plate 174 is an inlet port 189, and similarly formed in the end plate 175 is an annularly spaced high-pressure discharge passage 190 which communicates through a check-valve 191 to a high-pressure gas manifold 192 mounted on the underside of the lower end plate 175 and located concentrically around the shaft 170. The operation and construction of the compressor 172 is more fully described in the above-mentioned United States Letters Patent No. 3,001,384, and copending application, Serial No. 102,060, filed April 10, 1961, and is, therefore, neither illustrated nor described in detail herein.

The check-valve 191 consists of an arcuately shaped closure plate 193 normally lying in closurewise position over the discharge passage 190 and having outwardly extending flanges 194 which are bolted to and seated securely between two semi-circular clamps 195, 195', which are, in turn, mounted on the boss 177. A counterweight 196 is keyed to the shaft 170 in downwardly spaced relation to the compressor 172 to counteract the offset weight of the eccentrically located shaft portion 182. The compressor 172 is charged with a refrigerant such as freon-12 through a low-side inlet port $f$ and, in gaseous form, is drawn from the high-side of the system into the compressor 172 through the inlet port 189. The refrigerant is thereupon compressed and discharged from the compressor 172 under high pressure into the gas manifold 192 through the check-valve 191. Thus, the compressor 172 will operate under the proper back-pressure, and the compressed refrigerant gas is discharged under high-pressure into the manifold 192. Thereupon, the compressed refrigerant gas is conducted to a condenser M' by means of a high-side gas line 198.

Disposed within the control chamber housing 150 and supported by the bottom plate 154 is an inwardly dish-shaped retainer plate 199 which supports an outer support sleeve 200 which is integrally formed with an inwardly extending annular support flange 201 for supporting an inner support sleeve 202. Mounted on and supported by the outer sleeve 200 and the inner sleeve 202 is a cylindrical insulation disk 203 which is provided with an inwardly dish-shaped upwardly presented surface 204 The inner support sleeve 202 is integrally formed with an inwardly extending annular flange 205 for retaining a base-plate 206 which supports a liquid refrigerant control casing 207, the casing 207 being internally bored to form a liquid reservoir or chamber 209. The disk 203 is further internally bored from its underside to accommodate an oil separator 210 which consists of a separator casing 211 supported by a separator base-plate 212 which is, in turn, mounted on the upper end of the casing 207. The oil separator casing 211 is internally bored to provide an oil reservoir $r$ and is integrally provided with a diametrally reduced upper end 213 having a central aperture 214. By reference to FIG. 19, it can be seen that the control chamber casing 207 and the oil separator casing 211 have a smaller diametral size than the bore of the sleeve 202 and disk 203, respectively, forming an annular flash gas and oil passageway 215. The disk 203 is further internally bored from its upper end to provide a liquid overflow chamber 216 which commuincates with the flash gas and oil passageway 215 through an aperture 217, and is further integrally provided with an upstanding liquid retaining bead 218 formed on the annular margin of the aperture 217.

By reference to FIG. 19, it can be seen that each of the component parts are assembled to fit in a tight compact unit, and each are provided with sealing rings, eliminating the need for highly precisioned machined parts. Thus, the retainer plate 199 is annularly grooved to accommodate a sealing ring 219, and the outer sleeve 200 is pgrooved on its upper and lower surfaces for accommodating sealing rings 220, 221.

Threadedly mounted in the lower end of the counterweight 196 is a vertical sleeve 222, and disposed within and extending axially through the sleeve 222 is a shaft 223 which is secured to the sleeve 222 and rotatable therewith by means of an oil supply tube 224, which is mounted in radially aligned apertures formed within the sleeve 222 and the shaft 223, respectively. The shaft 222 is integrally formed with an impeller blade 225 at its lower end which serves as a refrigerant pump and is located within a liquid refrigerant pumping chamber 226 which is formed by the retainer plate 199, the base-plate 206 and the outer sleeve 200, substantially as shown in FIG. 19. Communication is provided between the pumping chamber 226 and the flash gas and oil passageway 215 through an aperture $b$ formed within the base-plate 206.

Mounted within the liquid refrigerant control chamber 209 is a centrifugal pick-up or liquid refrigerant throttle control 227 which includes a pair of hollow radial arms 228 which are mounted on a support ring 229, the support ring 229 in turn being mounted on the sleeve 222 by means of a set screw 230, the set screw 230 being movable within a groove 231 formed within the ring 229. Mounted on the ends of the radial arms 228 are scoops 232 which are substantially similar to the previously described scoops 116 and include partial covers 233. In this connection, it is to be noted that the arms 228 are bent downwardly at their peripheral ends so that the scoops will, in effect, act as corner pick up scoops. When the scoops 232 pick up liquid refrigerant within the chamber 209, the arms 228 will be forced backwardly with respect to the direction of shaft rotation against spring bands 234, which are mounted on the set screw 230. The support ring 229 and the sleeve 222 are each provided with radial apertures 235, 236, respectively, which will become radially aligned when the arms 228 are deflected against the action of the spring band 234, all for reasons which will presently more fully appear. Sealing rings 237, 238, are mounted on the sleeve 222 adjacent each of the plates 206, 212, respectively.

Mounted on the sleeve 222 within the oil reservoir $r$ is an impeller blade 239 which will pump oil through the oil supply tube 224 and which communicates with an oil capillary tube 240 internally formed within the shaft 223. The capillary tube 240 communicates with a capillary tube 241 formed within the rotatable shaft 170 and the offset portion 182 as the shaft 170 terminates slightly above the lower end of the bore formed within the counterweight 196.

In order to regulate the pressure within the chamber 209, the liquid overflow chamber 216 is provided with a capacity control 242 which includes a pair of radially extending paddle arms 243 secured to a support ring 244 which is, in turn, mounted on the sleeve 222 by means of a set screw 245, the set screw 245 being movable within a groove 246 formed within the ring 244. Biasing the paddle arms 243 in the direction of rotation of the shaft 223 is a spring-band 247 which is secured to the ring 244 by means of the set screw 245. The paddle arms 243 are substantially similar to the previously described paddle arms 95 except for a downwardly extending integrally formed tip portion 248, and include radial apertures 249 formed within the ring 244 which are in alignment with apertures 250, formed within the sleeve 222 when the paddle arms 243 are biased against the action of the spring-band 247 to the position shown in FIG. 19. The shaft 223 is annularly grooved to provide a pressure-relief bypass duct 251 which communicates with the reservoir 209 through apertures 252 formed within the sleeve 222 and with the radial apertures 250 formed within the sleeve 222. Thus, it can be seen that when the apertures 249, 250, are aligned, pressure can be relieved from the reservoir 209 into the low-pressure chamber 164. Similarly, the shaft 223 is annularly grooved to form a liquid refrigerant passage 253 which provides communication between the liquid refrigerant pumping chamber 226 and the refrigerant chamber 209, through an aperture 254 formed within the sleeve 222, when the apertures 235, 236, are aligned. An annular sealing ring 255 is concentrically mounted within the shaft 223 between the bypass duct 251 and the passage 253, respectively, and an annular sealing ring 225' is mounted within the upper end of the shaft 223.

The low-pressure gas within the chamber 164 is drawn into and compressed by the compressor 172 and is then delivered to the condenser M' through the high-pressure gas line 198. The liquid returning from the condenser is delivered to the control system through a liquid inlet port 257 which is connected to the liquid inlet pipe 258 formed within a bore in the outer sleeve 200. The pipe 258 communicates with a radial bore 259 formed within the sleeve 200 which communicates with an inlet pipe 260 extending radially through the sleeve 202, and which, in turn, communicates with the reservoir 209. The liquid refrigerant is discharged to a conventional evaporator N' through a liquid outlet port 261, which is connected to an outlet pipe 262 inserted within a bore formed in the retainer plate 199 and the bottom plate 154.

The control system forming part of the compressor control system B can be conveniently and rapidly assembled within the outer housing 150 by unbolting the same from the compressor housing 155. The bottom plate 154 is bolted to the flanges 152 by means of the bolts 153. The retainer plate 199 is disposed within the housing 150 at its open upper end and is followed by the rotatable shaft 223, and concentrically disposed over the shaft 223, is the sleeve 222. The outer support sleeve 200 is then disposed within the housing 150 and the radial pipe 260 is inserted within the bore formed within the inner sleeve 202, and the sleeve 202 is thereupon disposed within the housing 150 until it abuts the flange 201. The oil supply pipe 224 is next inserted within the radial bores formed within the sleeve 222 and the shaft 223 for rigidly securing the shaft 223 to the sleeve 222. The base-plate 206 is inserted in the housing 150 and concentrically encircles the shaft 223 until it abuts the flange 205 and is followed by the sealing ring 237. The centrifugal pick-up 227 is than mounted upon the sleeve 222 by tightening the set screw 230 and followed by the sealing ring 238, the liquid refrigerant casing 207, and the plate 212, thus forming the refrigerant control 227. The impeller blade 239 is thereupon mounted on the sleeve 222 and followed by the oil separator casing 211, thus forming the oil separator 210. The disk 203 is then disposed within the housing and thereupon the capacity control 242 can be mounted on the sleeve 222. Finally, the axially extending pipes 258, and 262, can be inserted within the lower end of the housing 150 through the retainer plate 199 and bottom plate 154, substantially as shown in FIG. 19, and the housing 150 bolted to the compressor housing 155. However, in order to secure the sleeve 222 within the threaded end of the counterweight 196, it is necessary to unbolt the bottom plate 154 and retainer plate 199 and thread the shaft 223 into the internally threaded bore of the counterweight 196. Thereupon, the retainer plate 199 can be inserted and the bottom plate 154 attached by means of the bolts 153. In this connection, it is to be noted that the direction of the thread should be such that they are self-tightening when the counterweight 196 is rotated.

In use, the electric motor 158 is connected to a suitable source of electric current (not shown) and energized thereby causing the shaft 170 to rotate. The charge of the initial gaseous refrigerant, which is enclosed within the hermetically sealed chamber 164, is introduced into the compressor 172 through the inlet port 189. The refrigerant is thereupon compressed to a point below its critical pressure, and when the pressure is sufficient, the check-valve 191 will be forced open, permitting the high-pressure gas to exhaust within the high-pressure gas manifold 192. Thereupon, the high-pressure gas is delivered through the high-side gas line 198 to the condenser M' where it is condensed to a liquid state and returned to the control system B through the liquid inlet port 257 and discharged through the pipes 258, 260, into the liquid refrigerant chamber 209. The scoops 232 will pick up liquid refrigerant, and when a sufficient quantity has been collected therein to produce an inertia-reaction at this particular velocity, the mass of liquid will force the arms 243 backwardly with respect to the direction of shaft rotation against the action of the spring-band 234. The angular rotation of the arms 243 will thereby align the radial apertures 235, 236, permitting the liquid refrigerant to flow through the passage 253 into the liquid refrigerant pumping chamber 226. The rotation of the impeller blade 225 will, in effect, pump the liquid refrigerant from the chamber 226 through the outlet port 261 to the evaporator N'. In this connection, it is to be noted that the walls of the refrigerant chamber 209 should be serrated as in the case of the previously described high-side liquid refrigerant chamber 102, to prevent the refrigerant from orbiting the chamber 209. If any entrained gas should be carried with the liquid refrigerant to the pumping chamber 226, or if any of the liquid should boil prior to delivery to the evaporator N', the flash gas thereby formed will pass through the aperture b formed within the plate 206 and through the flash gas and oil passageway 215, through the aperture 217 and into the low-pressure chamber 164. As the refrigerant delivered to the evaporator will be only in liquid state, this will insure a full-flooded condition within the evaporator. The refrigerant which has been thereupon expanded into a gaseous state in the evaporator N' is returned to the chamber 164 through the low-side inlet port f. It is to be noted that any entrained liquid which is carried with the low-pressured gas will be deposited within the liquid overflow chamber 216 and retained by the upstanding bead 218.

If the evaporator tends to run cold, that is to say that the load in the evaporator is decreased, liquid refrigerant will be returned with the low-pressure gas. As the accumulation of liquid refrigerant within the liquid overflow chamber 216 is sufficient to retard the rotation of the capacity control 242 against the action of the spring 247, the apertures 249, 250, will become aligned, thereby permitting a reduction of pressure within the liquid refrigerant chamber 209, permitting the high-pressured gas therein to exhaust to the low-pressure chamber 164.

If the evaporator should begin to run hot, that is to say that the load thereon is increased, less enrained liquid will be returned to the low-pressure chamber 164 and, therefore, will not accumulate within the liquid chamber 216. Thus, the capacity control 242 will not be retarded against rotation and the apertures 249, 250, will not be aligned. Therefore, the high-pressure within the chamber 209 will further insure delivery of a substantial amount of liquid to the pumping chamber 226 and thence to the evaporator N'. Any liquid which happens to boil within the pumping chamber 226 will pass through the flash gas and oil passageway 215. The entrained oil which is carried by the gaseous refrigerant will separate at the oil separator 210. In this connection, it is to be noted that any liquid refrigerant which happens to accumulate within the low-pressure oil reservoir r will immediately evaporate to the low-pressure chamber 164. The oil accumulated, however, will pass through the oil supply tube 224 and through the oil capillary tubes 240, 241, thereby lubricating the compressor 172.

It is also possible to provide another modified form of control system C, substantially as shown in FIGS. 31–40 and is designed primarily for use with an air-conditioning or refrigerating system which already employs a conventional compressor O, evaporator N", and condenser M", and requires no external source of motive power such as an electric motor.

The control system C includes an outer housing 300 which comprises left and right end sections 301, 302, respectively, each of which are provided with end plates 303, 304, and annular mating flanges 305, 306, respectively, and are secured together by means of an annular clamp ring 307. Disposed within the housing 300 and abutting each of the end plates 303, 304, are retainer plates 308, 308', each of which have an axially extending stub shaft 309, 309'. Disposed within and extending axially through the housing 300 is a rotatable shaft 310 which is journaled in bearings 311, 311', mounted on the stub shafts 309, 309', respectively. Also disposed within the housing 300 and abutting the retainer plate 308 is a low-side chamber casing 312 which is internally bored to provide a low-pressure gaseous refrigerant chamber 313 and is enclosed by means of an end plate 314.

The bore of the casing 312 is tapered inwardly to form a turbine section 315 which opens into a low-pressure pumping chamber 316 formed within the retainer plate 308. Disposed within the turbine section 315 is a turbine blade *t* including an annular ring 317 which is disposed concentrically around and secured to the shaft 310 and is provided with a plurality of radially extending impeller veins 318. Also mounted within the chamber 313, adjacent the turbine blade *t* is a capacity control 319 which is substantially identical to the previously described capacity control 94 and includes a support ring 320 and a pair of radially extending paddle arms 321. The support ring 320 is mounted on the shaft 310 by means of a set screw 322 which is movable within a slot 323 formed within the ring 320, the paddle arms 321 being biased in the direction of the shaft rotation by means of a spring-band 324 which is secured to the set screw 322. The low-pressure gases are returned from a conventional evaporator N", and introduced into the low-pressure chamber 313 through a low-side inlet port 325 and inlet passageway 326, which communicates with the chamber 313, substantially as shown in FIG. 34. The inlet gases contatin sufficient pressure and velocity to rotate the impeller veins 318, and thereby rotate the shaft 310. Any entrained liquid, which is carried by the low-pressure gas refrigerant, is deposited in the chamber 313, and the vapor-free gas is thereupon pumped through the low-pressure pumping chamber 316 to the conventional compressor O through an outlet port 328, formed within the end plate 303. In this connection, it is to be noted that the action of the impeller veins 318 will aid in the removal of gas from the low-pressure chamber 313. The chamber wall should preferably be serrated as in the case of the compressor and control systems A and B in order to prevent liquid refrigerant from orbiting the chamber 313. The support ring 320 and the shaft 310 are provided with radial apertures 329, 330, respectively, which are aligned when the paddle arms 321 are forced backwardly with respect to the direction of shaft rotation against the action of the spring-band 324. The apertures 329, 330, further communicate with an axial bypass duct 331 formed within the shaft 310.

The bypass duct 331 communicates through a radial bore 332 formed within the shaft 310 with a liquid refrigerant chamber 333, formed by a chamber casing 334, the chamber 333 having an inwardly tapering section 335. Enclosing the open end of the chamber 333 is an end plate 337 and mounted within the liquid refrigerant chamber 333 is a liquid refrigerant throttle control 338 which includes a support ring 339 mounted on the shaft 310 by means of a set screw 340, the set screw 340 being movable within a slot 341 formed within the ring 339. Formed with the support ring 339 are a pair of radially extending hollow arms 342 having curved portions 343 intermediate their ends, and mounted thereon are liquid refrigerant scoops 344 which are substantially identical to the previously described scoops 116 and 232, and project in the direction of the shaft rotation. The arms 342 are also biased in the direction of shaft rotation by means of a spring-band 345 which is secured to the set screw 340. The hollow arms 342 open into radial apertures 346, formed in the support ring 339, and which communicate with radial ducts 347, formed within the shaft 310, the ducts 347 communicating with an axial fluid passageway 348, also formed within the shaft 310. The fluid passageway 348 opens into a pumping chamber 349 formed within the casing 350 which is interposed between and abuts the retainer plate 308' and the liquid refrigerant chamber 333. Integrally formed on the end of the shaft 310 is an impeller blade 351 which serves as a pump.

The liquid refrigerant chamber 333 can be charged with a suitable liquid refrigerant from the conventional condenser M", through a liquid inlet port 352 which communicates with the chamber 333, through an aperture 353 formed therein. In this connection, it is to be noted that the walls of the chamber casing 334 should be serrated in order to prevent the liquid refrigerant from orbiting the chamber 333 as the arms 342 rotate. After sufficient liquid refrigerant has accumulated within the chamber 333, the resultant mass will produce an inertia-reaction which will cause the radial arms 342 to deflect with respect to the shaft rotation, thereby aligning the apertures 346 with the ducts 347. The liquid refrigerant within the chamber 333 will thereby be permitted to flow through the fluid passageway 348 into the pumping chamber 349, where the refrigerant will be pumped through a liquid outlet port 354 to the evaporator N".

The shaft 310 is further provided with a radial aperture 355 which communicates with a flash gas and oil passageway 356 which, in turn, communicates with the low-pressure chamber 316. For purposes of providing sealingwise contact between the various chambers, sealing rings 357, 358, are mounted on the shaft 310 within the chamber 333 and abut each of the end plates 314, 337, respectively.

In use, the control system C operates substantially identical to the previously described control system A. However, the low-pressure gases from the evaporator N" are introduced through the port 325 into the low-pressure chamber 313, thereby rotating the turbine blade *t* and shaft 310. Any entrained liquid carried with the low-pressure gas refrigerant will operate the capacity control 319 as previously described in connection with the capacity control 94. As the liquid has accumulated, the paddle arms 321 will be forced backwardly with respect to shaft rotation aligning the aperture 329, 330. Thus, pressure within the chamber 333 will be released and also fluid therein will be permitted to flow through the bore 332, the bypass duct 331, into the low-pressure chamber 313. As can be seen, this will, in effect, reduce the liquid delivered to the evaporator N" causing the evaporator N" to run hot.

When sufficient liquid has accumulated within the chamber 333, the throttle will open, permitting liquid refrigerant to flow through the passageway 348 into the pumping chamber 349, thence for delivery to the evaporator N". If the liquid refrigerant should boil in the pumping chamber 349, it will pass through the flash gas and oil passageway 356 into the low-pressure chamber 316, for recycling to the compressor O.

It should be understood that changes and modifications in the form, construction, arrangement, and combination of the several parts of the compressors and control means therefor may be made and substituted for those herein shown and described without departing from the nature and principle of my invention.

Having thus described my invention, what I claim and desire to secure by Letters Patent is:

1. A refrigeration system having a condenser, an evaporator and a compressor having an inlet port, an outlet port and unitary control means, a stationary outer housing, said compressor and control means being mounted in coaxial relationship to each other within said stationary outer housing, means connecting the outlet port of the compressor to the inlet of said condenser, a drive shaft extending axially through said housing and being operatively associated with said control means and compressor for driving the same, said control means including an outer casing having a liquid refrigerant chamber provided with an inlet port means connecting the inlet port of said liquid refrigerant chamber to the outlet of said condenser, means connecting said refrigerant chamber to the intake side of said evaporator, said outer casing having a liquid overflow chamber, means connecting said overflow chamber to the outlet side of said evaporator, and means connecting said overflow chamber to the low-pressure side of said compressor.

2. A refrigeration system having a condenser, an evaporator and a compressor having an inlet port, an outlet port and unitary control means, a stationary outer housing, said compressor and control means being mounted in coaxial relationship to each other within said stationary outer housing, means connecting the outlet port of the compressor to the inlet of said condenser, a drive shaft extending axially through said housing and being operatively associated with said control means and compressor for driving the same, said shaft having an eccentrically located portion, said compressor having a rotor mounted on and driven by said eccentrically located portion, said control means including an outer casing having a liquid refrigerant chamber provided with an inlet port, means connecting said inlet port of said refrigerant chamber to the outlet of said condenser, means connecting said refrigerant chamber to the intake side of said evaporator, said outer casing having a liquid overflow chamber, means connecting said overflow chamber to the outlet side of said evaporator, and means connecting said overflow chamber to the low-pressure side of said compressor.

3. A refrigeration system having a condenser, an evaporator and a compressor having an inlet port, an outlet port and unitary control means, a stationary outer housing, said compressor and control means being mounted in coaxial relationship to each other within said stationary outer housing, means connecting the outlet port of the compressor to the inlet of said condenser, a drive shaft extending axially through said housing and being operatively associated with said control means and compressor for driving the same, said shaft having an eccentrically located portion, said compressor having a rotor mounted on and driven by said eccentrically located portion, said control means including an outer casing having a liquid refrigerant chamber provided with an inlet port, means connecting said inlet port of said refrigerant chamber to the outlet of said condenser, means connecting said refrigerant chamber to the intake side of said evaporator, said outer casing having a liquid overflow chamber, means connecting said overflow chamber to the outlet side of said evaporator, means connecting said overflow chamber to the low pressure side of said compressor, said casing having a bypass duct interconnecting said liquid refrigerant chamber and said liquid overflow chamber, and valve means associated with said bypass duct for regulating the amount of liquid refrigerant in said liquid refrigerant chamber.

4. A refrigeration system having a condenser, an evaporator and a compressor having an inlet port, an outlet port and unitary control means, a stationary outer housing said compressor and control means being mounted in coaxial relationship to each other within said stationary outer housing, means connecting the outlet port of the compressor to the inlet of said condenser, a drive shaft extending axially through said housing and being operatively associated with said control means and compressor for driving the same, said shaft having an eccentrically located portion, said compressor having a rotor mounted on and driven by said eccentrically located portion, said control means including an outer casing having a liquid refrigerant chamber provided with an inlet port, means connecting said inlet port of said refrigerant chamber to the outlet of said condenser, means connecting said refrigerant chamber to the intake side of said evaporator, said outer casing having a liquid overflow chamber, means connecting said overflow chamber to the outlet side of said evaporator, means connecting said overflow chamber to the low pressure side of said compressor, said casing having a bypass duct interconnecting said liquid refrigerant chamber and said liquid overflow chamber, first normally closed valve means mounted within said liquid refrigerant chamber for regulating the amount of liquid refrigerant to be delivered to said evaporator, and second normally closed valve means mounted within said liquid overflow chamber for regulating communication with said bypass duct.

5. A refrigeration system having a condenser, an evaporator and a compressor having an inlet port, an outlet port and unitary control means, a stationary outer housing, said compressor and control means being mounted in coaxial relationship to each other within said stationary outer housing, means connecting the outlet port of the compressor to the inlet of said condenser, a drive shaft extending axially through said housing and being operatively associated with said control means and compressor for driving the same, said shaft having an eccentrically located portion, said compressor having a rotor mounted on and driven by said eccentrically located portion, said control means including an outer casing having a liquid refrigerant chamber provided with an inlet port, means connecting said inlet port of said refrigerant chamber to the outlet of said condenser, means connecting said refrigerant chamber to the intake side of said evaporator, said outer casing having a liquid overflow chamber, means connecting said overflow chamber to the outlet side of said evaporator, means connecting said overflow chamber to the low pressure side of said compressor, said casing having a bypass duct interconnecting said liquid refrigerant chamber and said liquid overflow chamber, first normally closed valve means mounted within and responsive to the amount of liquid refrigerant in said liquid refrigerant chamber for regulating the amount of liquid refrigerant to be delivered to said evaporator, and second normally closed valve means mounted within and responsive to the amount of liquid refrigerant in said liquid overflow chamber for regulating communication with said bypass duct.

6. A refrigeration system having a condenser, an evaporator and a compressor having an inlet port, an outlet port and unitary control means, a stationary outer housing, said compressor and control means being mounted in coaxial relationship to each other within said stationary outer housing, means connecting the outlet port of the compressor to the inlet of said condenser, a drive shaft extending axially through said housing and being operatively associated with said control means and compressor for driving the same, said shaft having an eccentrically located portion, said compressor having a rotor mounted on and driven by said eccentrically located portion, said control means including an outer casing having a liquid refrigerant chamber provided with an inlet port, means connecting said inlet port of said refrigerant chamber to the outlet of said condenser, said casing having a pumping chamber which is operatively connected to said refrigerant chamber through a first duct, means connecting said pumping chamber to the intake side of said evaporator, said outer casing having a liquid overflow chamber, means connecting said overflow chamber to the outlet side of said evaporator, means connecting said overflow chamber to the low pressure side of said compressor, said casing having a second duct interconnecting said liquid refrigerant chamber and said liquid overflow chamber, first normally closed valve means mounted within and responsive to the amount of liquid refrigerant in said liquid refrigerant chamber for regulating the amount of liquid refrigerant to be delivered to said evaporator, and second normally closed valve means mounted within and responsive to the amount of liquid refrigerant in said liquid overflow chamber for regulating communication with said second duct.

7. A refrigeration system having a condenser, an evaporator and a compressor having an inlet port, an outlet port and unitary control means, a stationary outer housing, said compressor and control means being mounted in coaxial relationship to each other within said stationary outer housing, means connecting the outlet port of the compressor to the inlet of said condenser, a drive shaft extending axially through said housing and being operatively associated with said control means and compressor for driving the same, said shaft having an eccentrically located portion, said compressor having a rotor mounted on and driven by said eccentrically located portion, said control means including an outer casing having a liquid refrigerant chamber provided with an inlet port, means connecting said inlet port of said refrigerant chamber to the outlet of said condenser, said casing having a pumping chamber which is operatively connected to said refrigerant chamber through a first duct, means connecting said pumping chamber to the intake side of said evaporator, said casing having a liquid overflow chamber and a low side gas chamber operatively connected to said liquid overflow chamber, means connecting said overflow chamber to the outlet side of said evaporator, means connecting said low side gas chamber to the low pressure side of said compressor, said casing having a second duct interconnecting said liquid refrigerant chamber and said liquid overflow chamber, first normally closed valve means mounted within and responsive to the amount of liquid refrigerant in said liquid refrigerant chamber for regulating the amount of liquid refrigerant to be delivered to said evaporator, and second normally closed valve means mounted within and responsive to the amount of liquid refrigerant in said liquid overflow chamber for regulating communication with said second duct.

8. A refrigeration system having a condenser, an evaporator and a compressor having an inlet port, an outlet port and unitary control means, a stationary outer housing, said compressor and control means being mounted in coaxial relationship to each other within said stationary outer housing, means connecting the outlet port of the compressor to the inlet of said condenser, a drive shaft extending axially through said housing and being operatively associated with said control means and compressor for driving the same, said shaft having an eccentrically located portion, said compressor having a rotor mounted on and driven by said eccentrically located portion, said control means including an outer casing having a liquid refrigerant chamber provided with an inlet port, means connecting said inlet port of said refrigerant chamber to the outlet of said condenser, said casing having a pumping chamber which is operatively connected to said refrigerant chamber through a first duct, means connecting said pumping chamber to the intake side of said evaporator, said casing having a liquid overflow chamber and a low side gas chamber operatively connected to said liquid overflow chamber, means connecting said overflow chamber to the outlet side of said evaporator, means connecting said low side gas chamber to the low pressure side of said compressor, said casing having a second duct interconnecting said liquid refrigerant chamber and said liquid overflow chamber, said casing having a flash gas passageway connecting said pumping chamber to said low-side chamber, first normally closed valve means mounted within and responsive to the amount of liquid refrigerant in said liquid refrigerant chamber for regulating the amount of liquid refrigerant to be delivered to said evaporator, and second normally closed valve means mounted within and responsive to the amount of liquid refrigerant in said liquid overflow chamber for regulating communication with said second duct.

9. A refrigeration system having a condenser, an evaporator and a compressor having an inlet port, an outlet port and unitary control means, a stationary outer housing, said compressor and control means being mounted in coaxial relationship to each other within said stationary outer housing, means connecting the outlet port of the compressor to the inlet of said condenser, a drive shaft extending axially through said housing and being operatively associated with said control means and compressor for driving the same, said shaft having an eccentrically located portion, said compressor having a rotor mounted on and driven by said eccentrically located portion, said control means including an outer casing having a liquid refrigerant chamber provided with an inlet port, means connecting said inlet port of said refrigerant chamber to the outlet of said condenser, said casing having a pumping chamber which is operatively connected to said refrigerant chamber through a first duct, means connecting said pumping chamber to the intake side of said evaporator, said casing having a liquid overflow chamber and a low side gas chamber operatively connected to said liquid overflow chamber, means connecting said overflow chamber to the outlet side of said evaporator, means connecting said low side gas chamber to the low pressure side of said compressor, said casing having a second duct interconnecting said liquid refrigerant chamber and said liquid overflow chamber, said casing having a flash gas passageway connecting said pumping chamber to said low-side chamber, oil separator means interposed between said pumping chamber and low side chamber for removing oil entrained with the flash gas, first normally closed valve means mounted within and responsive to the amount of liquid refrigerant in said liquid refrigerant chamber for regulating the amount of liquid refrigerant to be delivered to said evaporator, and second normally closed valve means mounted within and responsive to the amount of liquid refrigerant in said liquid overflow chamber for regulating communication with said second duct.

10. Control means for use with a refrigeration system having a compressor, a condenser and an evaporator which are operatively interconnected to provide a refrigeration circuit whereby refrigerant flows from the compressor to the condenser, then from the condenser to the evaporator and finally from the evaporator back to the compressor, said control means including first normally closed valve means connected in the portion of the circuit between the condenser and evaporator, first dynamically reactive means driven by the compressor operatively associated with the first valve means for opening said first valve means responsive to the quantity of liquid refrigerant flowing between the condenser and the evaporator and thereby regulating the amount of liquid refrigerant delivered to said evaporator, second normally closed valve means connected in the portion of the circuit between the evaporator and the compressor, and second dynamically reactive means driven by the compressor operatively associated with the second valve means for opening said second valve means responsive to the quantity of liquid refrigerant flowing between the evaporator and the compressor and thereby regulating the amount of gaseous refrigerant returned to said compressor.

11. Control means for use with a refrigeration system having a compressor, a condenser and an evaporator which are operatively interconnected to provide a refrigeration circuit whereby refrigerant flows from the compressor to the condenser, then from the condenser to the evaporator and finally from the evaporator back to the compressor, said control means including first normally closed valve means connected in the portion of the circuit between the condenser and evaporator, first dynamically reactive means driven by the compressor operatively associated with the first valve means for opening said first valve means responsive to the quantity of liquid refrigerant flowing between the condenser and the evaporator and thereby regulating the amount of liquid refrigerant delivered to said evaporator, second normally closed valve means connected in the portion of the circuit between the evaporator and the compressor, second dynamically reactive means driven by the compressor operatively associated with the second valve means for opening said second valve means responsive to the quantity of liquid refrigerant flowing between the evaporator and the compressor and thereby regulating the amount of gaseous refrigerant delivered to said compressor, and oil separation means mounted in said housing and being adapted to separate entrained oil from any gas passing from the evaporator to said compressor.

12. Control means for use with a refrigeration system having a compressor, a condenser and an evaporator which are operatively interconnected to provide a refrigeration circuit whereby refrigerant flows from the compressor to the condenser, then from the condenser to the evaporator and finally from the evaporator back to the compressor, said control means including first normally closed valve means connected in the portion of the circuit between the condenser and evaporator, first dynamically reactive means driven by the compressor operatively associated with the first valve means for opening said first valve means responsive to the quantity of liquid refrigerant flowing between the condenser and the evaporator and thereby regulating the amount of liquid refrigerant delivered to said evaporator, second normally closed valve means connected in the portion of the circuit between the evaporator and the compressor, second dynamically reactive means driven by the compressor operatively associated with the second valve means for opening said second valve means responsive to the quantity of liquid refrigerant flowing between the evaporator and the compressor and thereby regulating the amount of gaseous refrigerant delivered to said compressor, first oil separation means mounted within said casing and being adapted to separate entrained oil from any gas passing from the evaporator to the compressor, and second oil separation means mounted within said casing and being adapted to separate entrained oil from any liquid passing from the condenser to the evaporator.

13. A unitary control means for use with a refrigeration system having a condenser, a compressor and an evaporator which are operatively interconnected to provide a refrigeration circuit whereby refrigerant flows from the compressor to the condenser, then from the condenser to the evaporator and finally from the evaporator back to the compressor, said control means comprising an outer housing, a drive shaft extending axially through said housing and adapted to drive said control means, said control means including an outer casing having a liquid refrigerant chamber provided with an inlet port, means connecting said inlet port to said condenser, said casing having a pumping chamber which is operatively connected to said refrigerant chamber through a first duct, means connecting said pumping chamber to the intake side of said evaporator, said outer casing having a liquid overflow chamber, means connecting said overflow chamber to the low pressure side of said evaporator, means connecting said overflow chamber to the low pressure side of the said compressor, said casing having a second duct interconnecting said liquid refrigerant chamber and said liquid overflow chamber, first normally closed valve means mounted within and responsive to the amount of liquid refrigerant in said liquid refrigerant chamber for regulating the amount of liquid refrigerant to be delivered to said evaporator, and second normally closed valve means mounted within and responsive to the amount of liquid refrigerant in said liquid overflow chamber for regulating communication with said second duct and thereby controlling the pressure in the liquid refrigerant chamber.

14. A unitary control means for use with a refrigeration system having a condenser, a compressor and an evaporator which are operatively interconnected to provide a refrigeration circuit whereby refrigerant flows from the compressor to the condenser, then from the condenser to the evaporator and finally from the evaporator back to the compressor, said control means comprising an outer housing, a drive shaft extending axially through said housing and adapted to drive said control means, said control means including an outer casing having a liquid refrigerant chamber provided with an inlet port, means connecting said inlet port to said condenser, said casing having a pumping chamber which is operatively connected to said refrigerant chamber through a first duct, means connecting said pumping chamber to the intake side of said said evaporator, said casing having a liquid overflow chamber and a low-side gas chamber operatively connected to said liquid overflow chamber, means connecting said overflow chamber to the low pressure side of said evaporator, means connecting said low-side gas chamber to the low pressure side of said compressor, said casing having a second duct interconnecting said liquid refrigerant chamber and said liquid overflow chamber, said casing having a flash gas passageway connecting said pumping chamber to said low-side chamber, oil separator means interposed between said pumping chamber and low-side chamber for removing oil entrained with the flash gas, first normally closed valve means mounted within and responsive to the amount of liquid refrigerant in said liquid refrigerant chamber for regulating the amount of liquid refrigerant to be delivered to said evaporator, and second normally closed valve means mounted within and responsive to the amount of liquid refrigerant in said liquid overflow chamber for regulating communication with said second duct.

15. A unitary control means for use with a refrigeration system having a condenser, a compressor and an evaporator which are operatively interconnected to provide a refrigeration circuit whereby refrigerant flows from the compressor to the condenser, then from the condenser to the evaporator and finally from the evaporator back to the compressor, said control means comprising an outer housing, a drive shaft extending axially through said housing and adapted to drive said control means, said control means including an outer casing having a liquid refrigerant chamber provided with an inlet port, means connecting said inlet port to said condenser, said casing having a pumping chamber which is operatively connected to said refrigerant chamber through a first duct, means connecting said pumping chamber to the intake side of said evaporator, said outer casing having a liquid overflow chamber, means connecting said overflow chamber to the low pressure side of said evaporator, means connecting said overflow chamber to the low pressure side of said compressor, said casing having a second duct interconnecting said liquid refrigerant chamber and said liquid overflow chamber, first normally closed valve means mounted within and responsive to the amount of liquid refrigerant in said liquid refrigerant chamber for regulating the amount of liquid refrigerant to be delivered to said evaporator, second normally closed valve means mounted within and responsive to the amount of liquid refrigerant in said liquid overflow chamber for regulating communication with said second duct, and turbine means mounted on said shaft and adapted to drive said shaft by the low pressure gas introduced in said liquid overflow chamber.

16. A capacity control for use in refrigeration systems, said control comprising an outer casing having a shaft extending axially therethrough, a first sleeve concentrically mounted on said shaft and having an annular groove, a second sleeve disposed over and concentrically encircling said first sleeve, said second sleeve having an aperture communicating with said annular groove, a valve mounted on said second sleeve and having an aperture normally biased out of communication with the aperture in said sleeve, and dynamically reactive means operatively associated with said valve for aligning said valve aperture with the valve on said sleeve responsive to the quantity of liquid refrigerant in said casing.

17. A capacity control for use in refrigeration systems, said control comprising an outer casing with an inner serrated wall and having a shaft extending axially therethrough, a first sleeve concentrically mounted on said shaft and having an annular groove, a second sleeve disposed over and concentrically encircling said first sleeve, said second sleeve having an aperture communicating with said annular groove, a valve mounted on said second sleeve and having an aperture normally biased out of communication with the aperture in said sleeve, and dynamically reactive means operatively associated with said valve for aligning said valve aperture with the valve on said sleeve responsive to the quantity of liquid refrigerant in said casing.

18. A capacity control for use in refrigeration systems, said control comprising an outer casing with an inner serrated wall and having a shaft extending axially therethrough, a first sleeve concentrically mounted on said shaft and having an annular groove, a second sleeve disposed over and concentrically encircling said first sleeve, said second sleeve having an aperture communicating with said annular groove, a ring member mounted on said sleeve, and at least one arm member extending radially from said ring, said ring having an aperture normally biased out of communication with the aperture in said sleeve, said arm member being responsive to the amount of liquid refrigerant in said casing and adapted to align said apertures and provide communication therebetween when the liquid refrigerant in said casing reaches a predetermined minimum value.

19. A capacity control for use in refrigeration systems, said control comprising an outer casing with an inner serrated wall and having a shaft extending axially therethrough, a first sleeve concentrically mounted on said shaft and having an annular groove, a second sleeve disposed over and concentrically encircling said first sleeve, said second sleeve having an aperture communicating with said annular groove, a ring member mounted on said sleeve, and a pair of diametrally opposed arms extending radially from said ring, said ring having an aperture normally biased out of communication with the aperture in said sleeve, said arms being responsive to the amount of liquid refrigerant in said casing and adapted to align said apertures and provide communication therebetween when the liquid refrigerant in said casing reaches a predetermined minimum value.

20. A capacity control for use in refrigeration systems, said control comprising an outer casing with an inner serrated wall and having a shaft extending axially therethrough, a first sleeve concentrically mounted on said shaft and having an annular groove, a second sleeve disposed over and concentrically encircling said first sleeve, said second sleeve having an aperture communicating with said annular groove, a ring member mounted on said sleeve, and a pair of diametrally opposed flat rectilinear arms extending radially from said ring, said ring having an aperture normally biased out of communication with the aperture in said sleeve, said arms being responsive to the amount of liquid refrigerant in said casing and adapted to align said apertures and provide communication therebetween when the liquid refrigerant in said casing reaches a predetermined minimum value.

21. A capacity control for use in refrigeration systems, said control comprising an outer casing with an inner serrated wall and having a shaft extending axially therethrough, a first sleeve concentrically mounted on said shaft and having an annular groove, a second sleeve disposed over and concentrically encircling said first sleeve, said second sleeve having an aperture communicating with said annular groove, a ring member mounted on said sleeve, and a pair of diametrally opposed hollow arms extending radially from said ring, said ring having an aperture normally biased out of communication with the aperture in said sleeve, said arms being responsive to the amount of liquid refrigerant in said casing and adapted to align said apertures and provide communication therebetween when the liquid refrigerant in said casing reaches a predetermined minimum value.

22. The method of assembling a compressor and unitary control means in an outer housing having two endwise abutting sections, one of said sections having an annular shoulder and said compressor having an axially extending shaft; said method comprising mounting a counterweight having an aperture upon the shaft, clamping the compressor between each of said sections, inserting a retainer plate from the open end of one of said sections until it abuts the annular shoulder, inserting a cylindrical reservoir casing having a bore within said section until it abuts said retainer plate, inserting a first sleeve within the casing and fastening same within the aperture of said counterweight, inserting a first end plate within the bore of said cylindrical reservoir casing, inserting a second sleeve in the bore of said reservoir casing until it abuts said first end plate, inserting a liquid overflow casing within the bore of the second sleeve until it abuts said first end plate, mounting a first valve upon said first sleeve, inserting a second end plate within said section until it abuts said liquid overflow casing and second sleeve, inserting a high-side chamber casing within said section until it abuts said second end plate, mounting a second valve upon said first sleeve, inserting a support ring within the bore of said high-side chamber casing, inserting a third end plate in said section until it abuts the support ring and high-side chamber casing, inserting a third sleeve within said casing until it abuts said reservoir casing, inserting a fourth sleeve concentrically around said third sleeve, inserting a fifth sleeve axially within said first sleeve, inserting a rotatable shaft within said fifth sleeve and securing same within said aperture formed in the counterweight, inserting a second retainer plate within the section until it abuts the fourth sleeve, and finally securing an end plate to flanges formed on said section.

23. The method of assembling a compressor and unitary control means in an outer housing having two endwise abutting sections, one of said sections having an annular shoulder and said compressor having an axially extending shaft; said method comprising mounting a counterweight having an aperture upon the shaft, clamping the compressor between each of said sections, inserting a retainer plate from the open end of one of said sections until it abuts the annular shoulder, inserting a cylindrical reservoir casing having a bore within said section until it abuts said retainer plate, inserting a first sleeve within the casing and fastening same within the aperture of said counterweight, inserting a first end plate within the bore of said cylindrical reservoir casing, mounting a first sealing ring upon said first sleeve, inserting a second sleeve in the bore of said reservoir casing until it abuts said first end plate, inserting a liquid overflow casing within the bore of the second sleeve until it abuts said first end plate, mounting a first valve upon said first sleeve, inserting a second end plate within said section until it abuts said liquid overflow casing and second sleeve, mounting a second sealing ring upon said first sleeve, inserting a high-side chamber casing within said section until it abuts said second end plate, mounting a second valve upon said first sleeve, mounting a third sealing ring upon said first sleeve, inserting a support ring within the bore of said high-side chamber casing, inserting a third end plate in said section until it abuts the support ring and high-side chamber casing, inserting a third sleeve within said casing until it abuts said reservoir casing, inserting a fourth sleeve concentrically around said third sleeve, inserting a fifth sleeve axially within said first sleeve, inserting a rotatable shaft within said fifth sleeve and securing same within said aperture formed in the counterweight, inserting a second retainer plate within the section until it abuts the fourth sleeve, and finally securing an end plate to flanges formed on said section.

24. The method of assembling a compressor and unitary control means therefor in an outer housing having two endwise abutting sections, one of said sections having an annular shoulder, said compressor having an axially extending shaft; said method comprising mounting said compressor in one of said sections, mounting a counterweight upon the shaft extending through said compressor, rigidly securing an end plate to one open end of the other section, inserting a retainer plate within the remaining open end of such section, inserting a rotatable shaft within said section until it abuts said retainer plate, concentrically encircling said shaft with a first sleeve, inserting a second support sleeve having a bore within said housing until it abuts said retainer plate, inserting a third sleeve having a bore and annular flanges within the bore of said second sleeve, inserting a first plate within the bore of said third sleeve until it abuts the flange formed within said third sleeve, mounting a first valve upon said first sleeve, inserting a liquid refrigerant casing within the bore of said third sleeve until it abuts said first plate, inserting a second plate within said casing until it abuts the open end of said liquid refrigerant casing, mounting an impeller blade upon said first sleeve immediately above said second plate, inserting a cylindrical housing with a bore within said section until it abuts said second plate, inserting a cylindrical disk within said housing until it abuts said second sleeve, mounting a second valve upon said first sleeve, removing said end plate and retainer plate from said section, threading said shaft into an aperture in the counterweight, reinserting said retainer plate and securing said end plate to the section, and rigidly securing one of the sections to the other of said sections.

25. The method of assembling a compressor and unitary control means therefor in an outer housing having two endwise abutting sections, one of said sections having an annular shoulder, said compressor having an axially extending shaft; said method comprising mounting said compressor in one of said sections, mounting a counterweight upon the shaft extending through said compressor, rigidly securing an end plate to one open end of the other section, inserting a retainer plate within the remaining open end of such section, inserting a rotatable shaft within said section until it abuts said retainer plate, concentrically encircling said shaft with a first sleeve, inserting a second support sleeve having a bore within said housing until it abuts said retainer plate, inserting a third sleeve having a bore and annular flanges within the bore of said second sleeve, inserting a first plate within the bore of said third sleeve until it abuts the flange formed within said third sleeve, mounting a first sealing ring upon said first sleeve, mounting a first valve upon said first sleeve, mounting a second sealing ring upon said first sleeve, inserting a liquid refrigerant casing within the bore of said third sleeve until it abuts said first plate, inserting a second plate within said casing until it abuts the open end of said liquid refrigerant casing, mounting an impeller blade upon said first sleeve immediately above said second plate, inserting a cylindrical housing with a bore within said section until it abuts said second plate, inserting a cylindrical disk within said housing until it abuts said second sleeve, mounting a second valve upon said first sleeve, removing said end plate and retainer plate from said section, threading said shaft into an aperture in the counterweight, reinserting said retainer plate and securing said end plate to the section, and rigidly securing one of the sections to the other of said sections.

References Cited by the Examiner

UNITED STATES PATENTS

| | | | |
|---|---|---|---|
| 1,659,163 | 2/1928 | Ruegger | 62—218 X |
| 1,764,654 | 6/1930 | Spreen | 62—509 X |
| 1,889,817 | 12/1932 | Andiffren et al. | 62—499 X |
| 2,520,191 | 8/1950 | Aughey et al. | 62—225 |
| 2,539,062 | 1/1951 | Dillman | 62—225 |
| 2,641,109 | 6/1953 | Muffly | 62—220 X |
| 2,642,724 | 6/1953 | Carter | 62—225 |
| 2,738,657 | 3/1956 | Jacobs | 62—508 |
| 2,776,542 | 1/1957 | Cooper | 62—508 |
| 2,811,841 | 11/1957 | Grimshaw | 62—499 X |
| 2,909,042 | 10/1959 | Long | 62—219 X |
| 2,979,921 | 4/1961 | Sampietro | 62—243 X |
| 2,992,543 | 7/1961 | Moody. | |
| 3,025,684 | 3/1962 | McLain et al. | 62—499 |
| 3,062,020 | 11/1962 | Heidorn | 62—243 X |

ROBERT A. O'LEARY, *Primary Examiner.*

MEYER PERLIN, *Examiner.*